(12) United States Patent
Chen et al.

(10) Patent No.: US 9,245,446 B2
(45) Date of Patent: Jan. 26, 2016

(54) SWITCHED LINK-BASED VEHICULAR NETWORK ARCHITECTURE AND METHOD

(75) Inventors: Wai Chen, Basking Ridge, NJ (US); Ratul Guha, Kendall Park, NJ (US); John Lee, Howell, NJ (US); Junichiro Fukuyama, Union, NJ (US); Rama Vuyyuru, Somerset, NJ (US)

(73) Assignees: Telcordia Technologies, Inc., Piscataway, NJ (US); Toyota Infotechnology Center, U.S.A., Inc., Mountain View, CA (US)

( * ) Notice: Subject to any disclaimer, the term of this patent is extended or adjusted under 35 U.S.C. 154(b) by 950 days.

(21) Appl. No.: 13/167,135

(22) Filed: Jun. 23, 2011

(65) Prior Publication Data

US 2012/0327840 A1    Dec. 27, 2012

(51) Int. Cl.
| | |
|---|---|
| *G06G 1/16* | (2006.01) |
| *H04L 12/18* | (2006.01) |
| *H04L 12/26* | (2006.01) |
| *H04L 12/753* | (2013.01) |
| *H04L 12/741* | (2013.01) |
| *H04L 29/08* | (2006.01) |

(Continued)

(52) U.S. Cl.
CPC ............. *G08G 1/163* (2013.01); *H04L 12/189* (2013.01); *H04L 12/1854* (2013.01); *H04L 45/48* (2013.01); *H04L 45/54* (2013.01); *H04W 40/246* (2013.01); *H04B 7/15521* (2013.01); *H04L 12/185* (2013.01); *H04L 67/12* (2013.01); *H04W 84/18* (2013.01); *H04W 88/04* (2013.01); *H04W 92/18* (2013.01)

(58) Field of Classification Search
CPC .. G06G 1/163; H04B 7/15521; H04L 12/185; H04L 12/1854; H04L 12/189; H04L 43/10; H04L 45/48; H04L 45/54; H04L 67/12; H04W 40/20; H04W 40/246; H04W 48/10; H04W 84/18; H04W 88/04; H04W 92/18; H04H 20/57
USPC ........................................................ 370/315
See application file for complete search history.

(56) References Cited

U.S. PATENT DOCUMENTS 7,359,775 B2 *   4/2008   Strege et al. ................. 701/31.4
2007/0001869 A1 *   1/2007   Hunzinger .................... 340/903

(Continued)

OTHER PUBLICATIONS

Stuedi et al., "ASAP-Adaptive QoS Support with Reduced Reservation Overhead in MANETs." ftp://ftp.inf.ethz.ch/pub/publications/tech-reports/4xx/447.pdf. 2004.
Li et al. "Comparison of Ad Hoc and Centralized Multihop Routing." http://citeseerx.ist.psu.edu/viewdoc/download?   doi=10.1.13.7366 &rep=rep1&type=pdf. 2002.

(Continued)

*Primary Examiner* — Parth Patel
*Assistant Examiner* — Kai Chang
(74) *Attorney, Agent, or Firm* — Roger S. Burleigh

(57) ABSTRACT

A multiple hop communications method among a plurality of moving vehicles. Each moving vehicles has a plurality of unidirectional radio. The method comprises receiving an incoming packet at one of the plurality of unidirectional radios, determining if there is an active link between each of the plurality of unidirectional radios and an unidirectional radio of a neighbor vehicle, relaying the incoming packet to the plurality of unidirectional radios having an active link and transmitting the incoming packet as an outgoing packet from at least one of the plurality of unidirectional radios. If more than one packet is received, the packets can be encoded using group coding before send the packets out as an outgoing packet.

38 Claims, 26 Drawing Sheets

(51) Int. Cl.
| | |
|---|---|
| H04B 7/155 | (2006.01) |
| H04H 20/57 | (2008.01) |
| H04W 40/20 | (2009.01) |
| H04W 40/24 | (2009.01) |
| H04W 48/10 | (2009.01) |
| H04W 92/18 | (2009.01) |
| H04W 88/04 | (2009.01) |
| H04W 84/18 | (2009.01) |
| G08G 1/16 | (2006.01) |

(56) References Cited

U.S. PATENT DOCUMENTS

| | | | |
|---|---|---|---|
| 2007/0032245 A1* | 2/2007 | Alapuranen | 455/456.1 |
| 2007/0115897 A1 | 5/2007 | Chen et al. | |
| 2007/0117525 A1* | 5/2007 | Osafune | 455/99 |
| 2009/0279462 A1* | 11/2009 | Luo et al. | 370/310 |
| 2009/0310608 A1 | 12/2009 | Chen et al. | |
| 2010/0076670 A1* | 3/2010 | Turner et al. | 701/117 |
| 2010/0246470 A1* | 9/2010 | Jerbi et al. | 370/312 |
| 2010/0248618 A1* | 9/2010 | Bai | H04L 12/1818 455/11.1 |
| 2011/0134840 A1* | 6/2011 | Kim et al. | 370/328 |
| 2012/0038489 A1* | 2/2012 | Goldshmidt | 340/903 |

OTHER PUBLICATIONS

Ahmed et al., "Vanetcode: Network Coding to Enhance Cooperative Downloading in Vehicular Ad-Hoc Networks." http://delivery.acm.org/10.1145/1150000/1143654/p527-ahmed.pdf?ip=207.106.208.98&acc=Active%20service&CFID=137048252&cftoken=97009989&__acm__=1344262325_5af2bfee9c48042870458b10a1c55c2d. 2006.

Ingelrest et al., "A Turnover based Adaptive Hello Protocol for Mobile Ad Hoc and Sensor Networks." Http://hal.archives-ouvertes.fr/docs/00/38/40/09/PDF/main.pdf. May 14, 2009.

Qayyum et al., "Multipoint Relaying for Flooding Broadcast Messages in Mobile Wireless Networks." http://hal.inria.fr/docs/00/47/16/99/PDF/hicss2001.pdf. Apr. 9, 2010.

International Application No. PCT/US2012/038941—PCT International Search Report dated Aug. 3, 2012.

Wai Chen et al. A multi-antenna switched links based inter-vehicular network architecture. Vehicular Networking Conference (VNC), 2009 IEEE, IEEE, Piscataway, NJ, USA, Oct. 28, 2009, pp. 1-7, XP031630264, ISBN: 978-1-4244-5685-7.

Azzedine Boukerche et al. Algorithms and Protocols for Wireless. Mobile Ad Hoc Networks > Chapter 5: A Taxonomy of Routing Protocols for Mobile Ad Hoc Networks > 5.4 Ad Hoc Networks Routing Protocols : Safari Books Online. Nov. 10, 2008, pp. 1-43.

* cited by examiner

Detection Table 300

| Vehicle ID | Staleness Timer | Other Parameters |
|---|---|---|
| $V_x$ | | |
| $V_y$ | | |
| $V_z$ | | |

Figure 3

Link Table
800

| Antenna ID | Neighbor ID | Antenna ID | Location | Other info |
|---|---|---|---|---|
| F1 | Vx | B1 | Lx | - |
| R1 | - | - | - | - |
| B1 | Vy | L2 | Ly | - |

Figure 8

Payload (application data)

Switched Outgoing Packet
1000

Switched Packet List Table
1100

| S_ID | S_SEQ_NUM |
|------|-----------|
| aaa  | 12        |
| bbb  | 10        |

Figure 11

| Incoming | outgoing |
|---|---|
| B1 | R1, F1, L1 |
| R1 | B1, L1 |

Switching Table 1500

|       | $N_1$ | $N_2$ | $N_3$ | $N_4$ | $N_5$ | $N_6$ | $N_7$ | $N_8$ |
|-------|-------|-------|-------|-------|-------|-------|-------|-------|
| $N_1$ | 1     | 1     | 1     |       |       |       |       |       |
| $N_2$ | 1     | 1     | 1     |       |       |       |       |       |
| $N_3$ | 1     | 1     | 1     | 1     | 1     |       |       |       |
| $N_4$ |       |       | 1     | 1     | 1     |       | 1     |       |
| $N_5$ |       |       | 1     | 1     | 1     | 1     | 1     | 1     |
| $N_6$ |       |       |       |       | 1     |       |       | 1     |
| $N_7$ |       |       |       | 1     | 1     |       | 1     | 1     |
| $N_8$ |       |       |       |       | 1     | 1     | 1     | 1     |

1. LNL ={$N_1$ $N_2$ $N_3$}  OLL ={$L_{12}$ $L_{13}$}

2. LNL ={$N_1$ $N_2$ $N_3$}  OLL ={$L_{12}$ $L_{13}$} - No update

3. LNL ={$N_1$ $N_2$ $N_3$ $N_4$ $N_5$}  OLL ={$L_{12}$ $L_{13}$, $L_{34}$ $L_{35}$,}

4. LNL ={$N_1$ $N_2$ $N_3$ $N_4$ $N_5$ $N_7$}  OLL ={$L_{12}$ $L_{13}$ $L_{34}$ $L_{35}$ $L_{47}$ }

5. LNL ={$N_1$ $N_2$ $N_3$ $N_4$ $N_5$ $N_7$ $N_6$ $N_8$}
   OLL ={$L_{12}$ $L_{13}$ $L_{34}$ $L_{35}$ $L_{47}$ $L_{56}$ $L_{58}$ }
   Spanning Tree 2000

Figure 20

Spanning tree for $N_1$ as the root

$OLL(N1) = \{L_{12}\ L_{13}\ L_{34}\ L_{35}\ L_{47}\ L_{56}\ L_{58}\}$

1500A

Switching Table for N3

| source | Incoming | outgoing |
|--------|----------|----------|
| N1 | B1 | R1, F1 |
|  |  |  |

Figure 22

SWITCHED LINK-BASED VEHICULAR NETWORK ARCHITECTURE AND METHOD

FIELD OF THE INVENTION

This invention relates to mobile ad-hoc communications networks and methods for communication in mobile ad-hoc communications networks. More particular, this invention relates to a network architecture and method for communicating between moving objects where each moving object includes a plurality of uni-directional radio antennas.

BACKGROUND OF THE INVENTION

Ad-hoc wireless communication has been used in moving devices such as a moving vehicle with the use of mobile networks (MANET). One type of MANET is a vehicular ad-hoc network (VANET) that refers to a mobile ad-hoc network designed to provide communications among nearby vehicles and between vehicles and nearby fixed equipment.

A VANET can be used to disseminate many aspects of vehicle safety applications, including, but not limited to, urgent road obstacle warning, intersection coordination, hidden driveway warning, lane-change or merging assistance. However, simply installing wireless antenna on a node and then transmitting uncoordinated communications would result in collision of data, interference between data and a significant transmission delay. By transmitting uncoordinated data, the airwaves would be flooded with a plurality of messages, which would result in a jamming of the radio waves, as the radio bandwidth is limited. As such, each node would interfere with each other's transmission and compete with each other for radio bandwidth for transmission. In omni-directional systems even with coordination, channel contention severely limits performance resulting in difficulty to achieve reliable V2V communication, e.g., DSRC/Wave based networks.

These problems become more apparent in ad-hoc networks where the nodes are moving at high speeds. The high mobility and lack of inherent relationships make a priori configuration of nodes into groups problematic. Information such as traffic advisories, Amber alerts, weather advisories, etc. must be relayed to all vehicles quickly, without delay and interference.

SUMMARY OF THE INVENTION

Accordingly, disclosed is a multiple hop communications method among a plurality of moving vehicles. Each of the plurality of moving vehicles has a plurality of unidirectional radios. The method comprises receiving an incoming packet at one of the plurality of unidirectional radios, determining if there is an active link between each of the plurality of unidirectional radios and an unidirectional radio of a neighbor vehicle, relaying the incoming packet to the plurality of unidirectional radios having an active link and transmitting the incoming packet as an outgoing packet from at least one of the plurality of unidirectional radios. The method further comprises detecting unidirectional radios of a neighbor vehicle. The unidirectional radio of a neighbor vehicle is detected based upon receiving a periodic broadcast from the unidirectional radio of the neighbor vehicle. The periodic broadcast includes a node identifier and radio identifier for the neighbor vehicle.

The method further comprises storing in a detection table of the unidirectional radios, the node identifier and radio identifier for the neighbor vehicle, setting a staleness timer for the unidirectional radio of neighbor vehicle to a variable staleness value and associating the staleness timer with the neighbor vehicle in the detection table. The method further comprises removing a node identifier and radio identifier from the detection table when the staleness timer expires. The variable staleness value can be based upon a speed of the neighbor vehicle and a speed of the vehicle.

The method further comprises forming the active link. The active link is formed by a two-way handshake. The two-way handshake comprises sending a request to a neighbor vehicle having a node identifier and radio identifier in the detection table, the request including a requesting node identifier, requesting node radio identifier, neighbor vehicle node identifier and neighbor vehicle radio identifier, starting a request timer and adding a radio link to an active link table as an active link if a positive response is received from the neighbor vehicle prior to an expiration of the request timer. The active link table includes the neighbor vehicle node identifier, a neighbor vehicle radio identifier and a location of the neighbor vehicle.

The method further comprises determining whether to form an active link between a vehicle and a neighbor vehicle having a node identifier and a neighbor vehicle radio identifier in the detection table based upon at least one selection criterion. The selection criterion can be a location of a radio corresponding to the neighboring vehicle radio identifier within a vehicle.

The method further comprises removing a node identifier and radio identifier from the active link table when a second staleness timer expires.

The method further comprises adding the received packet into a switched packet list table.

The method further comprises determining if the incoming packet has been previously received based upon the switched packet list table and discarding the incoming packet without relaying if the incoming packet had been previously received. If the incoming packet had not been previously received, the method further comprises transmitting the incoming packet from all of the unidirectional radios with an active link as an outgoing packet, the transmission including a unidirectional radio which received the incoming packet.

Alternatively, a sub-set of the unidirectional radios with an active link transmit the outgoing packet. The method further comprises determining the sub-set of unidirectional radios by initializing a switching table to be empty, periodically receiving a packet from a neighbor vehicle containing one-hop neighbor vehicle information for the neighbor vehicle, updating a two-hop table using the one-hop neighbor vehicle information, the updating including adding or changing a neighbor vehicle identifier, neighbor vehicle radio identifier and location, setting a timer for the updated two-hop table and the neighbor vehicle, determining if the neighbor vehicle is listed in a one-hop table is only neighbor of some vehicle in the two-hop table, adding a unidirectional radio corresponding to the neighbor vehicle to the switching table, removing the neighbor vehicle from the one-hop and the two-hop table and adding, iteratively, a unidirectional link corresponding to the neighbor vehicle from the one-hop table that is linked to maximum number of vehicles in the two-hop table, removing the neighbor vehicle from the one-hop and the two-hop table. A unidirectional radio is determined as the sub-set if the unidirectional radio is in the switching table.

The method further comprises generating the incoming packet at a source vehicle. The generating comprises defining a session for the incoming packet, the session including a session identifier and at least one destination vehicle identifier, determining a network session scope for the incoming packet, the network session scope including at least a maximum hop count, generating a payload for the incoming packet and generating a header for the incoming packet including at least the session and the network session scope.

The method further comprises determining if the vehicle is a destination, determining if the network session scope has been reached and discarding the incoming packet without relay if the network session scope has been reached.

Also disclosed is a multiple hop communications method among a plurality of moving vehicles, where each of the plurality of moving vehicles has a plurality of unidirectional radios. The method comprises receiving at least two incoming packets from at least one of the plurality of unidirectional radios, determining if there is an active link between each of the plurality of unidirectional radios and an unidirectional radio of a direct neighbor vehicle, encoding the at least two incoming packets using group coding, relaying a different encoded packet to each unidirectional having an active link and transmitting the different encoded packet as outgoing packets from each unidirectional having an active link, respectively.

The encoding comprises mapping the at least two incoming packets into one outgoing packet for each unidirectional radio having an active link using a plurality of mapping coefficients. The mapping is a linear combination of the at least two incoming packets and the mapping coefficients are randomly determined.

Also disclosed is a mobile wireless communications device comprising a plurality of unidirectional radios, at least one of the plurality of unidirectional radios being located on each side of the mobile wireless communications device and a processor for determining if there is an active link between each of the plurality of unidirectional radios and an unidirectional radio of a neighbor vehicle and relaying an incoming packet to a plurality of unidirectional radios having an active link. The incoming packet is transmitted as an outgoing packet from at least one of the plurality of unidirectional radios.

The unidirectional radio of a neighboring vehicle is detected based upon receiving a periodic broadcast from the unidirectional radio of the neighbor vehicle. The periodic broadcast includes a node identifier and radio identifier for the neighbor vehicle.

The mobile wireless communications device further comprises a storage device for storing a detection table having detection information for each of the unidirectional radios and a staleness timer set to a variable staleness value for each of the unidirectional radio of neighbor vehicle. The processor removes a node identifier and radio identifier from the detection table when the staleness timer expires.

The mobile wireless communications device further comprises a request timer. The storage device stores an active link table having link information for each of the plurality of unidirectional radios. The processor forms the active link by sending a request to a neighbor vehicle having a node identifier and radio identifier in the detection table associated with one of the plurality of unidirectional radios, starts the request timer, and adds a radio link to an active link table as an active link if a positive response is received from the neighbor vehicle prior to an expiration of the request timer. The active link table includes the neighbor vehicle node identifier, a neighbor vehicle radio identifier and a location of the neighbor vehicle. The request including a requesting node identifier, requesting node radio identifier, neighbor vehicle node identifier and neighbor vehicle radio identifier The storage device further stores a switched packet list table having active links used for transmitting a received packet. The processor adds a received packet into the switched packet list table that corresponds to the unidirectional radio that received the packet.

The processor further determines if the incoming packet has been previously received based upon the switched packet list table and discards the incoming packet without relaying if the incoming packet had been previously received. If the incoming packet had not been previously received, the incoming packet is transmitted from all of the unidirectional radios having an active link as an outgoing packet. The transmission includes a unidirectional radio which received the incoming packet.

Alternatively, a sub-set of the unidirectional radios with an active link transmit the outgoing packet.

The mobile wireless communications device further comprises an updated timer,

The storage device further stores a one-hop and a two-hop table. The processor determines a sub-set of the unidirectional radios with an active link for transmitting the outgoing packet by initializing a switching table to be empty, periodically receives a packet from a neighbor vehicle containing one-hop neighbor vehicle information for the neighbor vehicle, updates a two-hop table using the one-hop neighbor vehicle information, the updating including adding or changing a neighbor vehicle identifier, neighbor vehicle radio identifier and location, sets the update timer for the updated two-hop table and the neighbor vehicle; determines if the neighbor vehicle is listed in a one-hop table is only neighbor of some vehicle in the two-hop table, adds a unidirectional radio corresponding to the neighbor vehicle to the switching table; removes the neighbor vehicle from the one-hop and the two-hop table, and adds, iteratively, a unidirectional link corresponding to the neighbor vehicle from the one-hop table that is link to a maximum number of vehicles in the two-hop table, removing the neighbor vehicle from the one-hop and the two-hop table. All active links in the switching table transmit the outgoing packet.

Also disclosed is a computer readable storage device having a program of instructions for causing a computer to execute the method of receiving an incoming packet at one of a plurality of unidirectional radios in a mobile device, determining if there is an active link between each of the plurality of unidirectional radios and an unidirectional radio of another mobile device, relaying the incoming packet to the plurality of unidirectional radios having an active link; and transmitting the incoming packet as an outgoing packet from at least one of the plurality of unidirectional radios.

Also disclosed is a computer readable storage device having a program of instructions for causing a computer to execute the method of receiving at least two incoming packets from at least one of a plurality of unidirectional radios, determining if there is an active link between each of the plurality of unidirectional radios and an unidirectional radio of a direct neighbor mobile device, encoding the at least two incoming packets using group coding, relaying a different encoded packet to each unidirectional having an active link and transmitting the different encoded packet as outgoing packets from each unidirectional having an active link, respectively.

The encoding comprises mapping the at least two incoming packets into one outgoing packet for each unidirectional radio having an active link using a plurality of mapping coefficients. The mapping is a linear combination of the at least two incoming packets and the mapping coefficients are randomly determined.

BRIEF DESCRIPTION OF THE DRAWINGS

These and other features, benefits, and advantages of the present invention will become apparent by reference to the following figures, with like reference numbers referring to like structures across the views, wherein:

FIG. 3 illustrates an exemplary detection table;

FIG. 8 illustrates an exemplary Link table;

FIG. 11 illustrates an exemplary switched packet list table;

FIG. 15 illustrates an exemplary switching table;

FIG. 20 illustrates another exemplary of a mesh matrix and an exemplary spanning tree deviation in accordance with the invention;

FIG. 22 illustrates the resulting switched table for vehicle based upon the spanning tree depicted in FIG. 20;

DETAILED DESCRIPTION OF THE INVENTION

Switching means the transfer of packets from one radio/antenna to other radios/antennas within a vehicle.

Figure 1:
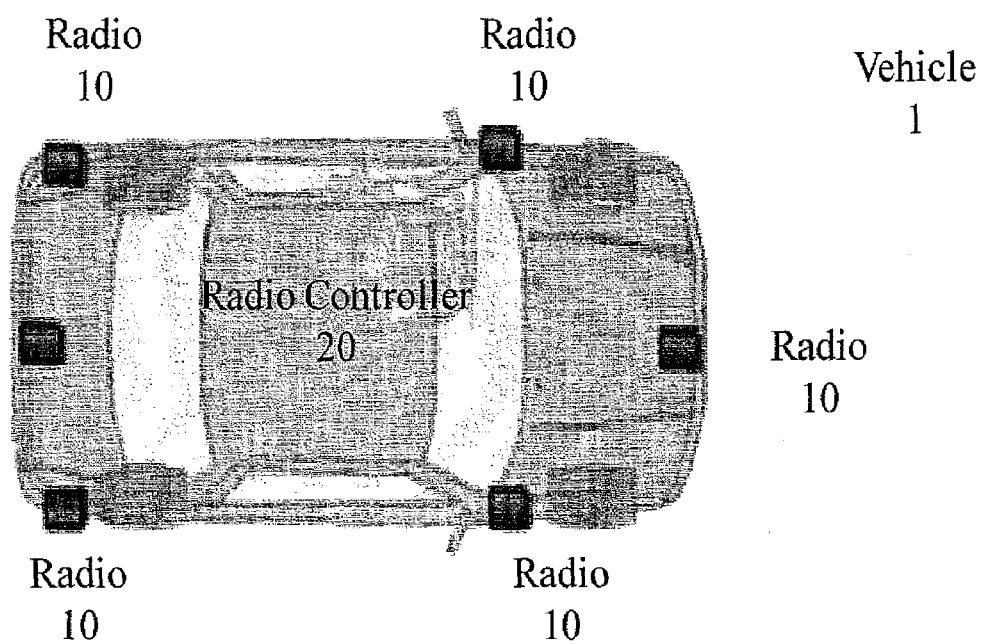
FIG. 1 illustrates a moving vehicle having a radio/antenna system in accordance with the invention.

FIG. 1 illustrates a moving vehicle 1 having a radio/antenna system in accordance with the invention. Each radio (hereinafter "radio(s)/antenna(s)") 10 is directional and as such focuses its energy only on a limited region. The antennas 10 can form 'directional links' (reference as "25" in FIG. 2) with antennas of other vehicle. Directional links 25 operate without interfering with other directional links. Owing to multiple radios/antennas 10, multiple simultaneous links can be established with neighboring vehicles. The detection and presence of surrounding vehicles is managed through a location/position awareness tables within a moving vehicle 1. Data can be disseminated in a multi-hop fashion. In this context, each vehicle 1 acts as a switching element in a grid of switches. The function of the switching element is to receive incoming data from a subset of its radios and relay it to a subset of the radios within each vehicle. Each vehicle can have multiple radios/antennas 10. The term 'radio' refers to the entire communicating device while the term antenna refers to the portion of the radio that transmits electromagnetic energy. The term "radio controller" reference to a processing section or control section that detects, monitors, forms the directional links and determines which radio/antenna 10 to relay data to and transmit data from.

As depicted in FIG. 1, the vehicle 1 has six radios/antennas; however, any number of radios/antennas 10 can be used. Each radio/antenna 10 has capability to detect and form a directional link with another radio in the range. Radios/antennas 10 communicate status through periodic beacons. If radio A hears a beacon from radio B, A assumes that A's transmission can be received at B. A directional link 25 is foliated after a two-way handshake. The two-way handshake will be described in detail later.

For purposes of the description each radio/antenna will be identified based upon a relative location. The radios/antennas at the front of the vehicle 1 can be numbered as F1, F2 etc. The antennas at the back of the vehicle can be numbered as B1, B2 etc. The radios/antennas on the left and the right side can be numbered as L1, L2, L3 and R1, R2, R3 etc. respectively.

Figure 2:
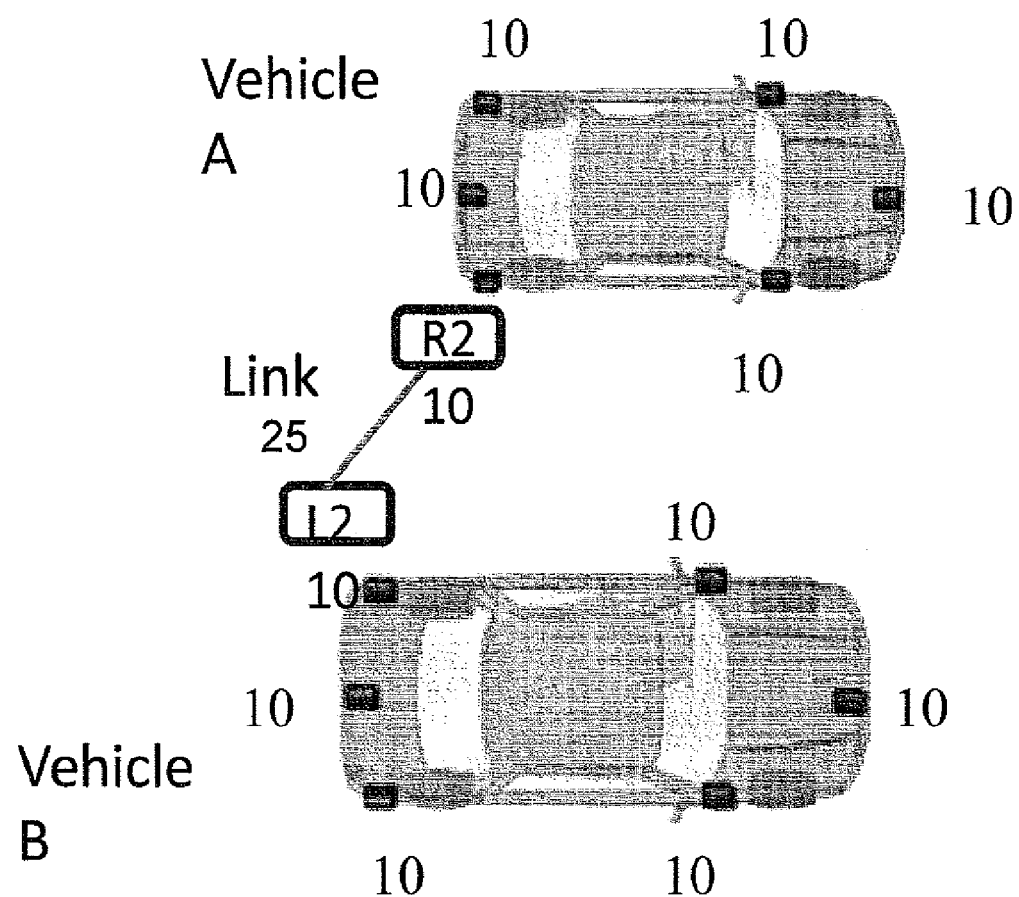
FIG. 2 illustrates an example of a directional link formed between two vehicles in accordance with the invention.

FIG. 2 illustrates an example of a directional link 25 formed between two vehicles: vehicle A and vehicle B. A directional link 25 is formed from R2 of Vehicle A and L2 of Vehicle B.

A vehicle 1 maintains, for each radio/antenna 10, a detection table (reference in FIG. 3 as "300") that lists the other radios that it can communicate with. The detection table 300 has the ID of the neighboring vehicle and other link attributes such as name of the radio (Fx, By . . . ), a power level, supported data rates, etc.

The information in the detection table 300 provides the possible choices for link establishment. The information is periodically updated. The period is variable and can dependent on vehicle speeds. Readings that are not updated are deemed stale and purged after an appropriate time. Staleness is determined based upon a timer (T). FIG. 3 illustrates an exemplary detection table 300.

Each radio/antenna periodically broadcasts a beacon. The beacon includes a vehicle ID, antenna ID and may include other information such as, but not limited to, a location. The beacon includes a synchronization preamble. The synchronization preamble is used for synchronization, frequency and channel estimation. The synchronization can be as long as 10 msecs. When the synchronization preamble is detected, demodulation of the packet commences and the detection table 300 is subsequently updated. The preamble includes pilot symbols with training sequences. The pilot symbols aid in channel estimation. This pilot symbols are known. In order to distinguish the beacons a Mask PHY address is used and appended the last few bits in the PHY preamble.

Figure 4:
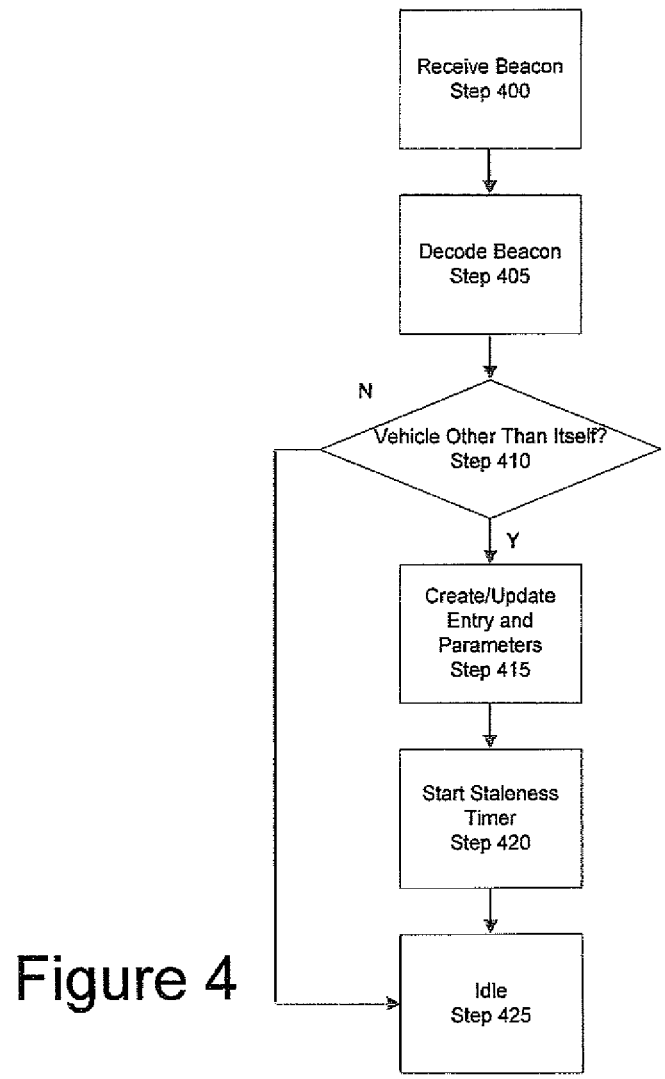
FIGS. 4 and 5 illustrate flow diagrams for creating and updating the detection table.
Figure 5:
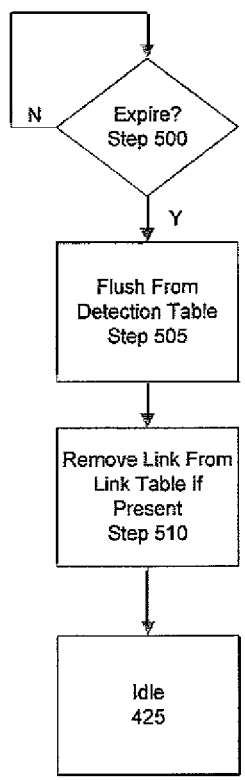

FIGS. 4 and 5 illustrate flow diagrams for creating and updating the detection table 300.

At step 400, the periodic beacon is received from a radio/antenna. The radio/antenna decodes the beacon at step 405. The decoded information is sent to the radio controller 20 for processing. The radio controller 20 determines if the beacon is from a vehicle 1 other than itself at step 410. The radio controller 20 compares the vehicle ID in the beacon with its own vehicle ID. If they are the same, the radio controller 20 returns to an idle state at step 425, effectively ignoring the received beacon. The term "idle state" as used herein is in reference to the process described in each of the flow diagrams, with respect to the triggering event, e.g., reception of a beacon. However, the radio controller 20 or other sub-layers described herein can perform other functions. For example, the radio controller 20 can be in an idle state 425 with respect to creating and updating the detection table, but in an active state with respect to, e.g., forming a link or responding to a request. Therefore, an idle state for the radio controller 20 may not be the same as the idle state for the broadcast sub-layer 900 or a session sub-layer 910. The broadcast sub-layer 900 and session sub-layer 910 will be described in detail later with respect to FIG. 9. The same reference number for the "idle state" 425 is used herein for description purpose only.

If the ID's are different, the beacon came from another vehicle and the process moves to step 415. If the beacon is received from a new radio/antenna 10, the radio controller 20 adds a new entry to the detection table 300, at step 415. The radio controller 20 compares the radio ID in the beacon with radio IDs in the detection table 300. If they do not match, the radio/antenna 10 is new. The radio controller 20 extracts the information in the decoded beacon and adds the information to the detection table 300. If the IDs match, the radio controller 20 updates the information in the entry for corresponding radio/antenna at step 415. Once the entry is either added or updated, the radio controller 20 starts the timer T to a variable value at step 420.

The radio controller 20 continuously monitors each timer T to remove stale entries. At step 500, the radio controller 20 determines if the timer T has expired for each entry. If the timer T=0 ("Y" at step 500), then the radio controller 20 removes the entry from the detection table 300 at step 505. Additionally, a link between the vehicle 1 and the radio/antenna 10 is removed from a link table, if present in table at step 510. The link table will be described later in full detail. Once the tables are updated, the radio controller 20 returns to an idle state at step 425.

If the timer T has not expired ("N" at step 500), the radio controller continues to monitor the timer (remains at step 500).

A two way handshake is used to establish a link between a pair of radios/antenna. Upon handshake the modalities of the connection such as private codes/sequences are shared. Once a link is created the Link is added to the Link Table.

Figure 6:
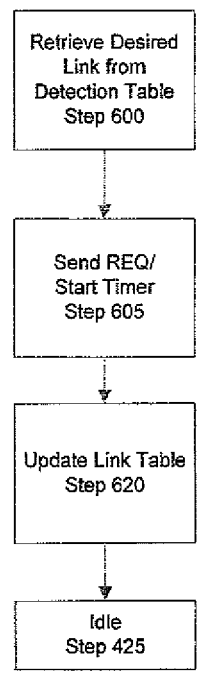
FIGS. 6 and 7 illustrate flow diagrams for establishing a link using the two-way handshake.
Figure 7:
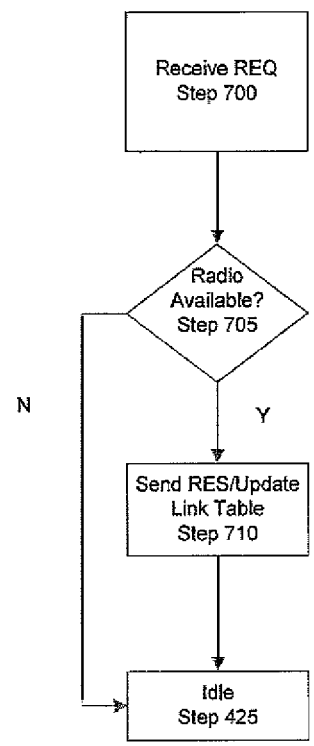

FIGS. 6 and 7 illustrate flow diagrams for establishing a link using the two-way handshake.

At step 600, a vehicle acquires a target radio/antenna for link formations from the detection table 300. The choice of which links to form may be based upon multiple criteria. For example, a priority-based selection of target radios can be made, e.g., front and back radio can have higher priority to ensure stability. The selection criterion can be varied. Initially, the priority-based selection can be default mode for choosing which links to form given the nature of vehicular network mobility.

Alternatively, other methods can be based on sequential or random assignment. Optimization based link formation that achieve objectives such as enhanced average degree, connectivity notion, etc. can also be used.

At step 605, a request "REQ" is sent to request a link formation to the target radio/antenna, i.e., a radio/antenna from another vehicle. The requesting vehicle also initializes a request timer (T2). If a response "RES" is received before a timer expires, then at step 620 a new link is added to the Link table (referenced in FIG. 8 as "800"). The Req includes a requesting vehicle ID, antenna ID for requesting radio/antenna, target vehicle ID and target radio/antenna ID from the detection table.

At step 700, the target vehicle receives the REQ. At step 705, the radio controller 20 in the target vehicle determines if the radio is available, i.e., the radio controller 20 checks the link table 800 to see if the radio/antenna 10 is in use. If the direction link 25 using the radio/antenna 10 is present in the link table 800, the radio/antenna 10 is not available. For a target vehicle receiving a REQ, a RES is sent if the radio is available at step 710 ("Y" at step 705). After that the Link table 800 is updated also at step 710. The link is added to the Link table 800. If the radio is not available ("N" at step 705), the radio controller 20 returns to an idle state at step 425.

The decision whether or not to form a link could be based on several factors. For example forming links based on instantaneous best quality would support better transmission reliability. If the link stability is important, then links can be chosen based on the duration for which it is possible to maintain such a link.

After a link is formed, packet collision can be reduced by using a hopping sequence. Each radio/antenna 10 has a common pseudo-random function. A pseudo-random generator, which is known at both ends, is used to generate a chipping sequence. Transmission is based on the chipping sequence, i.e., bits are sent at the instant determined by the chipping sequence.

Each of the REQ and RES messages contains an identifier such as a PHY address. The identifier is used as a seed to determine the sequence using the pseudo-random generator. Subsequent communication over the link uses the chipping sequences which have been determined by each of the two radio/antennas 10 that form the link. Alternatively, the chipping sequence can be reset for every packet transmission.

The beacons are transmits using a fixed seed.

Alternatively, a PN code can be used instead of a time-hopping sequence. A common PN code can be used for the beacon. A unique PN code is used for each link. Each radio/antenna 10 monitors multiple codes. The packets are decoded using matched filter and PN code tracking.

FIG. 8 illustrates an exemplary Link table 800. There is one such table per vehicle. The Link table 800 includes information about each radio and the ID of the vehicle it is connected to. Additionally, the Link table 800 includes the antenna ID for the radio on the neighboring vehicle (target vehicle) and its location. Furthermore, the Link Table can include additional information pertaining to the link such as, but not limited to, such as the MAC address and the IP address. In the link table 800, each vehicle 1 only keeps track of the directional links it forms with its neighboring vehicles, one-hop neighbors.

A vehicle 1 can have multiple links with the same vehicle 1. As the vehicles move the, distances will change and accordingly links will be broken and re-formed.

Each radio sends 1 beacon every N seconds. A vehicle can determine whether a link in the link table fails if a beacon has not been received for a preset number of consecutive ("L") beacon cycles. Both N and L can be varied depending on the speed of the vehicles and the number of vehicles in a given area. Link failures can occur as a result of fading, occlusion, decoding errors, noise etc.

After a link is formed, data packets are disseminated based on a switching table. The switching table will be described in detail later. The switching of links is maintained using a neighborhood broadcasting process and a switching maintenance process. The Neighborhood Broadcasting process manages to disseminate data packets and to eliminate duplicate packets, and the Switching Maintenance process provides the switching table for the Neighborhood Broadcasting process. These two processes are running in parallel.

The neighborhood broadcasting process can be session based. Each session dynamically arises (on-demand for the session among the corresponding peers) and disappears (when the session is finished). Each session network can have a packet scope. Each packet has a scope such as a time-to-live, i.e., the hops to travel, then filter out). Alternatively, an area or geographic location can be uses for the scope. Furthermore, traffic conditions can be used as a basis of the scope of the packet dissemination. Session-based packet dissemination is staggered for simultaneous (other) sessions (among other corresponding peers). Session based dissemination can support broadcast, unicast and multi-cast applications or packet dissemination. For broadcasting, the directional links are used to forward packets to all vehicles in the neighborhood, i.e., along the same direction. For unicasting or multicasting, neighborhood broadcasting is used to forward packets (all neighbors hear the messages), but only multicast (or unicast) members actually pick up the packets.

Each vehicle 1 forwards each packet once to each of its immediately-linked neighbors in the switching table. Duplicate packets are dropped. Before switching the packet to the active links, the vehicle 1 must check the packet for a duplicate. In order to eliminate duplicate packets, each vehicle 1 maintains a "Switched Packet List" (SPL) table.

Figure 9:
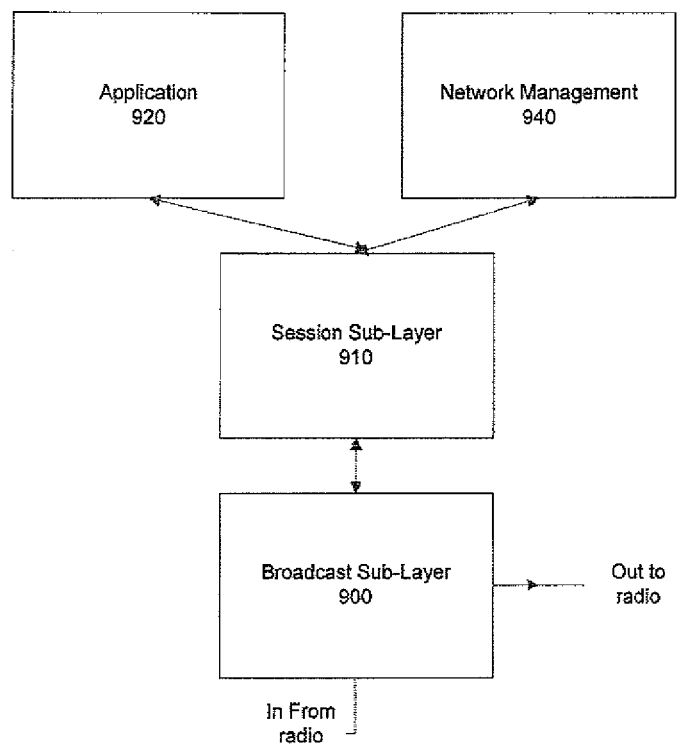
FIG. 9 illustrates several layers/sub-layers in the layer architecture in accordance with the invention.

A packet is relayed back towards the source as a confirmation of receipt. The neighborhood broadcasting process uses two sub layers: Session Dissemination Sub-Layer 910 and Broadcast Sub-Layer 900. FIG. 9 illustrates several layers/sub-layers in the layer architecture in accordance with the invention. There are two sub-layers and the application 920 and network management 940 layers in accordance with the invention. The two sub-layers act in parallel to enable communication.

The Session Dissemination Sub-Layer generates and adds a session header to a message from an application. It also passes the payload of a packet from the Broadcast Sub-Layer 900 to the Application based on the information in the session header of the packet. The Session Dissemination Sub-Layer 910 is a session interface to the application.

The Broadcast Sub-Layer 900 processes incoming packets from the network. It checks for both scope validation and packet duplication as described above. If an incoming packet is valid (i.e., the packet is within the scope and is not duplicate), it will be passed to the Session Dissemination Sub-Layer and also forwarded to the neighbors through the switched links.

The Broadcast Sub-Layer 900 maintains Switched Packet List which contains information about outgoing packets. Based on the Switched Packet List the Broadcast Sub-Layer 900 determines whether an incoming packet is a duplicate.

Figure 10:
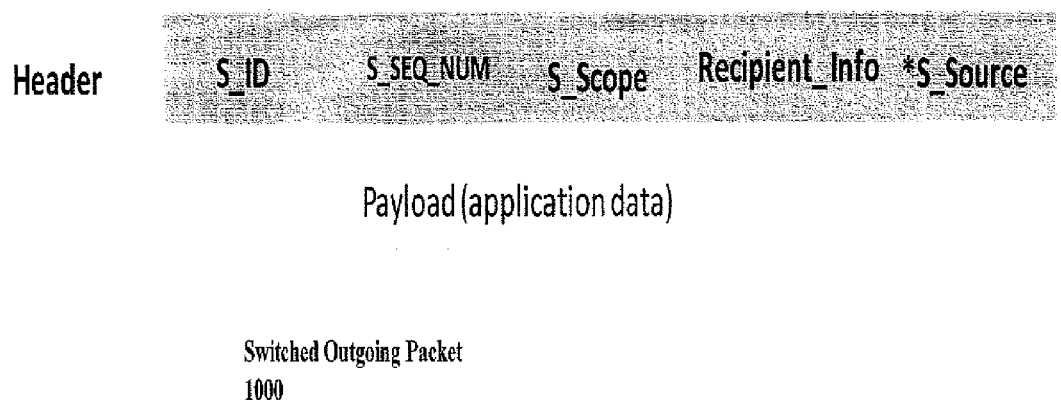
FIG. 10 illustrates an exemplary format for switched outgoing packet in accordance with the invention.

FIG. 10 illustrates an exemplary format for switched outgoing packet 1000 (hereinafter "Switched Packet") in accordance of the invention. The Switched Packet includes a header and a payload. This header is in addition to the header for the physical layer. Broadcast, multicast, or unicast applications use the same format of the header. They are differentiated by the contents of Recipient_Info field. As depicted in FIG. 10, S_ID is a session ID which can consist of, for example, an application ID plus Node ID (e.g., IP address). S_SEQ_NUM is the sequence number of the packet for a session. This number is unique in the session. S_Scope is the max number of hop-counts for the packet or Geographical scope for a session if GPS is available (e.g., a TTL value). Recipient_Info can include, but is not limited to, following subfields: Recipient(s) of session, i.e., individual Node IDs, TIME_INFO—Time related attribute for avoiding dissemination of outdated packets, Geographical recipients such as vehicles in a particular geographical area and Session group (e.g., S_ID) which represents the group of vehicles.

The S_Source is the source ID of the session. The source ID may or may not be included depending on the application. Additionally, a feedback field can be added to the switched packet 1000. A recipient of a switched packet 1000 checks whether the feedback field is set. If the field is set, it sends the hop count in the feedback field. This enables the session source to know the hop distances.

Every vehicle 1 maintains a switched packet list table (referenced as "1100" in FIG. 11) (hereinafter "SPL"). A SPL 1100 consists of S_ID, and S_SEQ_NUM as defined above. The combination of these two fields makes each packet unique so that duplicates can be determined based on such a combination. Each item listed in SPL 1100 is associated with a timer (T3). If T3 expires, the item is deleted from the SPL 1100. Incoming switched packets 1000 are accepted or dropped according to the SPL 1100.

Figure 12:
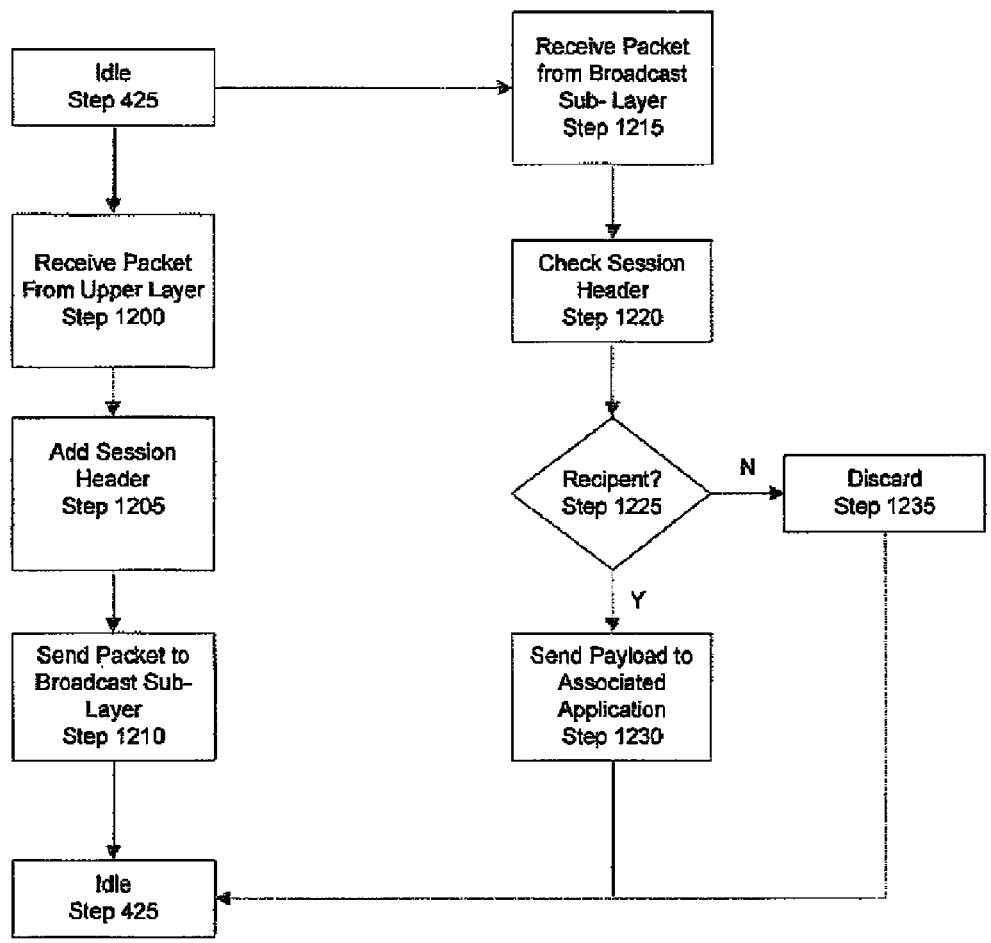
FIG. 12 illustrates a flow diagram for the functionality of the session dissemination sub-layer.

FIG. 12 illustrates a flow diagram for the functionality of the session dissemination sub-layer 910. The functionality of the session dissemination sub-layer is triggered by two events: receiving a packet from an upper layer (step 1200) or receiving a packet from the broadcast sub-layer (step 1215). When the session dissemination sub-layer 910 receives a message from an upper layer (step 1200), such as an application layer, it adds a switched packet header as described above to the message (step 1205) and forwards or passes the created packet (e.g., message with the header) to the broadcast sub-layer 900 (step 1210). After, the switched packet 1000 is sent to the broadcast sub-layer 900, session dissemination sub-layer 910 returns to an idle state 425.

When the session dissemination sub-layer 910 receives a switched packet 1000 from the Broadcast Sub-Layer 900 (step 1215), it checks the header of the switched packet 1000 whether the vehicle 1 is engaging in the session indicated in the header (step 1220). At step 1225, the session dissemination sub-layer 910 determines if the vehicle is a recipient of the switched packet 1000. If the vehicle 1 is engaging in the session ("Y" at step 1225), the payload of the packet will be passed to the application corresponding to the session (step 1230). If the vehicle 1 is not a recipient ("N" at step 1225), the packet is discarded and deleted at step 1235. Once the switched packet 1000 is either discarded (step 1235) or the payload is sent to the appropriate application, the session dissemination sub-layer 910 returns to an idle state (step 425).

Figure 13:
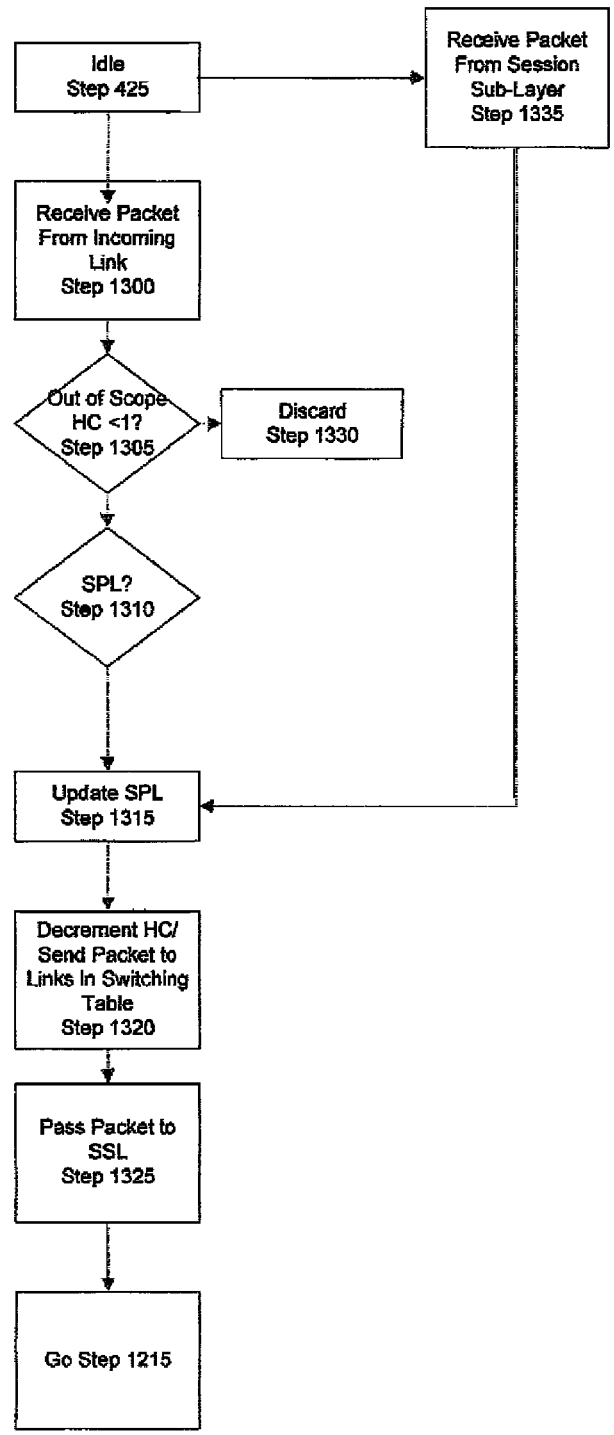
FIG. 13 illustrates a flow diagram for the functionality of the broadcast sub-layer.

FIG. 13 illustrates a flow diagram for the functionality of the broadcast sub-layer 900. The broadcast sub-layer 900 is triggered by two events: packet from an incoming link (step 1300) and a packet from the session dissemination sub-layer 910 (step 1335). When a vehicle 1 receives a packet from one of its neighboring vehicles via an incoming link (step 1300), the broadcast sub-layer 900 checks the packet header to find out if the scope of the packet is still valid at step 1305. If the packet is outside of the scope ("Y" at step 1305), the packet will be discarded (at step 1330) and the broadcast sub-layer 900 returns to the idle state (step 425). The determination is based upon the hop count value in the packet. If the hop count value in the packet is less than 1, the scope for the packet has been reached. If the hop count value in the packet is greater than 1, than the scope for the packet has not been reached.

If the scope of the packet is still valid ("N" at step 1305), the broadcast sub-layer 900 checks the SPL 1100 to see if the packet is a duplicate (step 1310). If the packet is new ("N" at step 1310), the SPL 1100 for the vehicle 1 is updated (step 1315). Specifically, the entry for the packet is added in the SPL 1100. On the other hand, if the packet is a duplicate packet ("Y" at step 1310), the packet will be discarded (at step 1330) and the broadcast sub-layer 900 will return to the idle state (step 425).

Once the SPL 1100 is updated, the broadcast sub-layer 900 passes the packet to the Session Dissemination Sub-Layer (step 1325). Additionally, the packet is copied as many as the number of all active links and the scope field of each copy is updated (i.e., decrement hop count) and sent to all links in a switching table 1500 (step 1320). The switching table 1500 will be described in detail later. Afterwards, the broadcast sub-layer 900 will return to the idle state (step 425).

Figure 14:
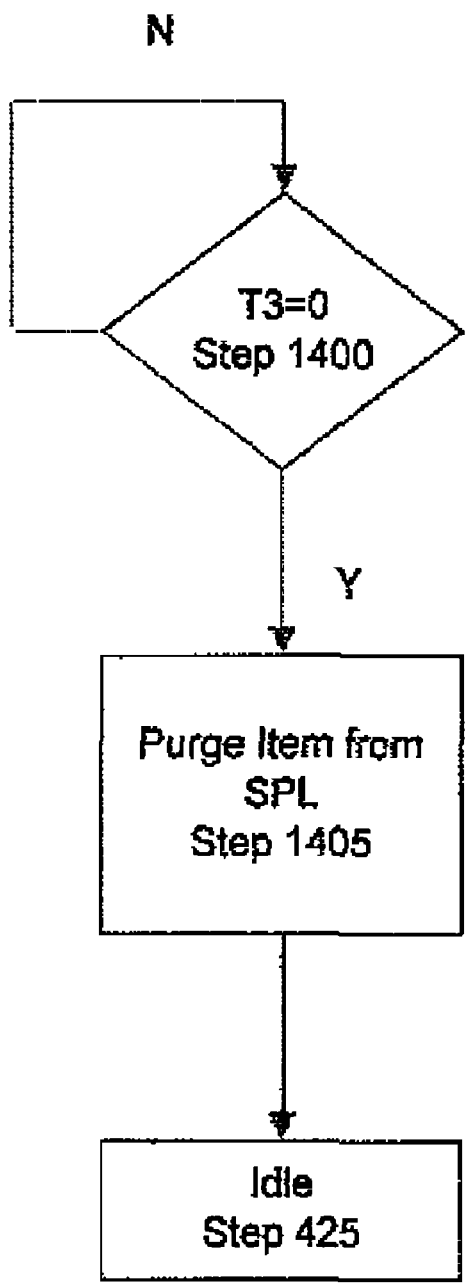
FIG. 14 illustrates a flow chart for the monitoring staleness of data in the SPL.

As noted above, each entry in the SPL 1100 is monitored for staleness. Each entry in SPL is associated with a timer. FIG. 14 illustrates a flow chart for the monitoring process. When the timer of an item in the SPL expires (step 1400), that item is removed from the SPL 1100 (step 1405). The broadcast sub-layer 900 then returns to an idle state 425.

Each vehicle 1 maintains a switching table 1500. An exemplary switching table 1500 is illustrated in FIG. 15. The switching table 1500 includes information relating to an incoming radio/antenna interface radio/antenna 10 where the switched packet 1000 arrived) and all outgoing radio/antenna interfaces radios/antennas 10 where the switched packet 1000 is sent out from). For the exemplary switching table 1500 depicted in FIG. 15, a switched packet 1000 from radio/antenna B1 would be sent to radio/antenna R1, F1 and L1. A switched packet 1000 on radio/antenna R1 would be sent to B1 and L1. A switched packet 1000 is send to neighboring vehicle according to the switching table 1500. The switching table 1500 can be derived using multiple methods or protocols in accordance with the invention. A radio link interface is considered to be a switching port.

The outgoing radio/antenna interfaces is determined based upon the switched packet routing protocol. In accordance with one example of the routing protocol, all radios/antennas 10 having an active link become the outgoing radio/antenna interfaces, e.g., No-mesh protocol. For example, if a vehicle 1 is linked to five different immediate neighbors and a switched packet 1000 is incoming through interface B1 (i.e., directional radio/antenna 10 on the back of the vehicle 1). The switched packet 1000 is switched to all five active links and sent out through corresponding five directional ratio links. All five direction radios/antennas 10 would appear as the outgoing interfaces in the Switching Table 1500. This type of routing does not need any information about neighboring vehicles.

Alternatively, a sub-set of all antenna(s)/radio(s) 10 having an active link be selected to become the outgoing radio/antenna interfaces, e.g., Mesh protocol. For example, as depicted in FIG. 15, the first row indicates that packets coming in on Interface B1 are sent to outgoing interfaces R1, F1 and L1. Only three active links of the five active links are used.

The Mesh protocol uses neighborhood information to select the outgoing radio/antenna interfaces. When a packet is received from one of radio link interfaces, the packet is switched to some or all (according to the switching table) of the radio link interfaces and depending on the protocol. As noted above, the switching table 1500 can be created using different methods and protocols. These methods and protocols can use varying degrees of available network information for the mesh operation. Further, the methods and protocols can be used to achieve various networking objectives such as, but not limited to, lowest hop count, most stable path, etc.

For example, a mesh protocol can be used to create the switching table 1500. In the Mesh protocol with two-hop information a neighborhood mesh or spanning tree is created using hop tables. Every vehicle 1 gathers neighborhood connectivity information to maintain its switching table 1500. A vehicle 1 sends periodic messages, which includes its one-hop neighbor information. Each vehicle 1 collects and maintains the immediate neighbor information. This allows every vehicle to have consistent neighboring information. The vehicles 1 then construct two-hop neighbor information from the one-hop neighbor information broadcast by each vehicle 1. The cycle period for the messages is variable. Additionally, the messages can be event driven, for example, the messages are sent only when the neighbors change. The messages or switching maintenance packets have the same format as the switched packet 1000. However, the payload for the switched packet is application data, whereas the payload for the switching maintenance packets is the neighborhood information.

The switching table 1500 of a vehicle 1 is updated based on changes in neighborhood connectivity.

Figure 16:
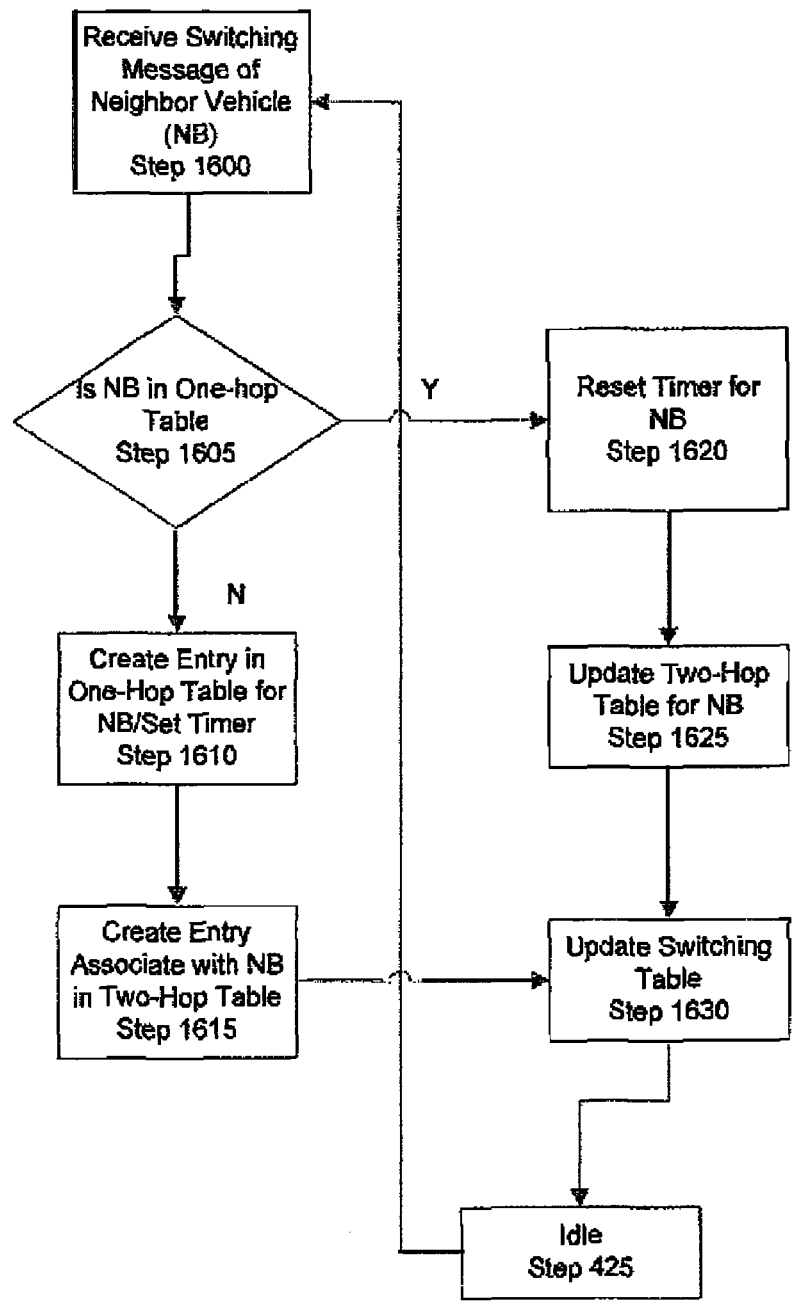
FIGS. 16 and 17 illustrate a flow chart for maintaining neighborhood information in accordance with the invention.
Figure 17:
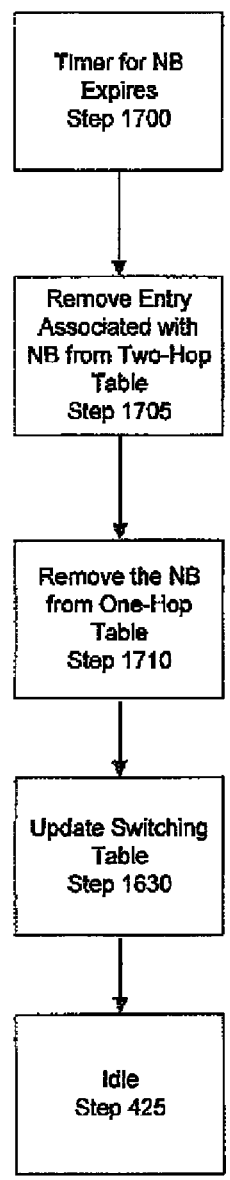

FIGS. 16 and 17 illustrate a flow chart for maintaining neighborhood information in accordance with the invention. FIGS. 16 and 17 depict a flow chart for a two-hop mesh routing. However, any number of hops for the mesh can be used as will be described later.

The updating of the hop tables is triggered by two events: receiving a switching maintenance packet (step 1600) and/or timer of a neighboring vehicle expiring (step 1700). The timer (T4) is used to remove vehicles 1 when they move away. The timer T4 is set to a preset number of cycles for the switching maintenance packets. For example if the cycle is N units long, T4 can be set to M*N, where M is the number of cycles.

When a vehicle 1 receives a switching maintenance packet from one of its neighboring vehicles, it finds out if the neighbor vehicle is listed in a one-hop table (step 1605). The radio controller 20 determines if the vehicle ID is already in the one-hop table by matching the ID in the table with the ID in the switching maintenance packet, If the neighbor is listed in the one-hop table ("Y" at step 1605), the vehicle 1 will reset the timer associated with the neighbor (step 1620) and update the entry associated with the neighbor in a two-hop table using the information in the payload of the switching maintenance packet (step 1625). The switching maintenance packet contains neighbor information. Receiving a switching maintenance packet from another vehicle provides two-hop neighbor information. Subsequently, the switching table is updated (step 1630).

On the other hand, if the neighbor is not listed in the one-hop table ("N" at step 1605), the neighbor vehicle 1 is a new neighbor. Accordingly, the vehicle 1 will create an entry for the neighbor in the one-hop table (step 1610) and also create an entry associated with the neighbor in the two-hop table (step 1615) using the information provided in the payload of the switching maintenance packet. The entry is instantiated and indicates the vehicle ID of the neighbor. Subsequently, the switching table 1500 is updated (step 1630).

When T4 for a neighbor in the one-hop table expires (i.e., T4=0) (step 1700), the entry associated with the neighbor in the two-hop table is removed (step 1705). The neighbor is removed from the one-hop table (step 1710). Subsequently, the switching table 1500 is updated (step 1630).

The one-hop and two-hop tables are used to select the active radio links for inclusion in the switching table 1500 as outgoing interfaces. The method for updating the switching table 1500 based upon the hop tables is defined below. In accordance with the protocol described herein, the active links are selected to distribute the switched packets 1000.

The selection of the links is based on covering (connecting to) two-hop neighbors with the smallest number of one-hop neighbors.

One-hop neighbors are defined as a set "V1" and two-hop neighbors are defined as a set "V2". The vehicles in each set are determined using the one-hop and two hop tables.

Figure 18:
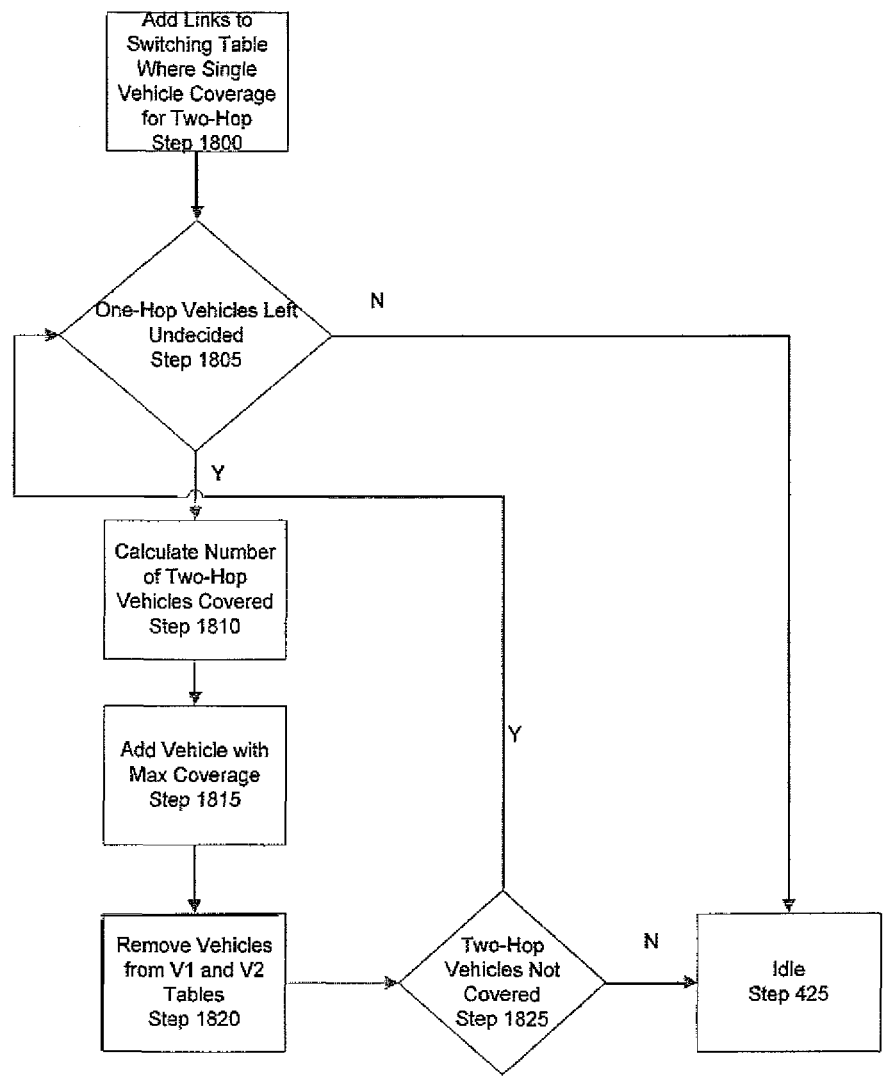
FIG. 18 illustrates a flow chart for creating or updating the switching table.

FIG. 18 illustrates a flow chart for creating or updating the switching table, e.g., selecting outgoing interfaces. The switching table 1500 is initialized as an empty set.

Active links are added to the switching table corresponding to one-hop neighbors in the set V1 which are the only neighbors of some vehicles in two-hop neighbor set V2 (step 1800). The links which connect to those selected one-hop neighbors become the outgoing interfaces. Afterward, the selected one-hop neighbors and those two-hop neighbors covered by the selected one-hop neighbors are removed from the set V1 and V2.

The radio controller 20 then determined if there are any vehicles left in V1, i.e., one-hop vehicles not decided (steps 1805). For each vehicle in $V_1$ not in the switching table, the radio controller 20 calculates the number of vehicles the vehicle in V1 covers in V2 (step 1810). Active links that correspond to the vehicle in V1 for which the calculated number of vehicles covered by that vehicle for vehicles in V2 is the maximum is added to the switching table 1500 (step 1815). The corresponding vehicles are removed from V1 and V2 (step 1820).

The radio controller 20 then determined if there are any vehicles left in V2, i.e., two-hop vehicles not covered (steps 1825). If there are vehicles in V2 not covered, steps 1805-1820 are repeated until V1 or V2 are empty sets. Once the sets are empty, the radio controller 20 returns to an idle state (step 425).

Figure 19:
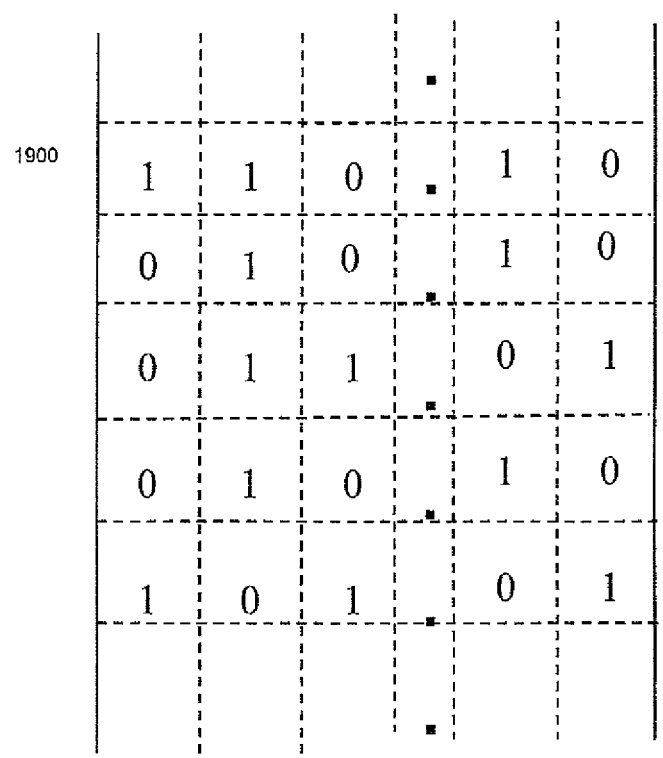
FIG. 19 illustrates an exemplary mesh matrix.

Alternatively, the Mesh protocol can use a spanning tree. The spanning tree is derived from a mesh matrix. Constructing, the mesh matrix requires switching maintenance packets to be sent for more than two hops. When using the spanning tree as opposed to the first example, the switching maintenance packets are sent across the network as opposed to just the neighboring vehicles. The mesh matrix represents a mapping of link connectively among all vehicles 1 in a given network and illustrates the status of direct connectivity for all possible pairs of vehicles in the network. For example, if a pair of two vehicles is directly connected; the value of the status for the link between two vehicles can be "1". If there are no direct connections, a "0" can be specified for that link. If the number of vehicles in the network is V, the mesh matrix would be V×V. Each row of the mesh matrix reflects information from a neighbor list of one vehicle 1. FIG. 19 illustrates an exemplary mesh matrix 1900.

Every vehicle should preferably have the same L matrix to generate a spanning tree (i.e., connects all vehicles through either a single hop or multiple hops) consistent to all vehicles in the network. However, due to the mobility of the vehicles 1, matrices across vehicles may differ. A status change due to mobility or link failure must be promptly reflected to the mesh matrix of all vehicles 1. This is performed in an event-driven fashion and does not need any prior setup. The event-driven message is simply broadcast to all neighboring nodes for dissemination.

As a result, every vehicle has the same set of V spanning trees where V is the number of vehicles 1 in the network: V spanning trees are derived from V different roots. The root of a spanning tree is considered as the source of a packet which is disseminated through the spanning tree. The spanning tree can be derived from the mesh matrix 1900 using the following method.

As described herein in the method $N_i$ denotes a node and $L_{ik}$ denotes a link. Link $L_{ik}$ is a link from node $N_i$ to $N_k$. An ANL denotes All Node List. An ANL for a network with V nodes is a set of $\{N_1, N_2, N_3, \ldots N_V\}$. A LNL denotes Linked Node List, which is a list of linked nodes. OLL denotes Outgoing Link List, which is links through which packets are forwarded. $OLL(N_i)$ is outgoing Link list for $N_i$ as a source, e.g., $OLL(N_i)=\{L_{11}, L_{24}, L_{15}, L_{23}$. Based on $OLL(N_i)$, each node obtains the incoming and outgoing interfaces for packets from $N_i$.

Start from first row of the mesh matrix 1900 (i.e., link status list for node $N_1$); $N_1$ would be the root of the spanning tree obtained for this iteration. Entries (i.e., links) with "1" (say $L_{1j}=1$) will be included in OLL. The corresponding neighboring nodes will be included in LNL, e.g., Func($N_1$) If LNL doesn't include all nodes in the network (i.e., LNL!=ANL), move to the row corresponding to the first node (e.g., $N_j$) listed in LNL, and repeat Func($N_j$). However, nodes and links already listed in LNL and OLL will not be included. If still LNL!=ANL, move to the row corresponding to the next node (e.g., $N_k$) listed in LNL and repeat Func($N_k$). This is repeated until LNL=ANL. At this end, a spanning tree for $N_1$ as a root is formed. Obtain the incoming and outgoing interfaces for packets from $N_1$.

The above process is repeated for each row, i.e., second to V row, where V is the number of vehicles 1 in the network. The process generates a spanning tree with the shortest hop count. FIG. 20 illustrates another example of a mesh matrix 1900A having eight vehicles. FIG. 20 also illustrates the derivation of the spanning tree 2000 on the right of the figure, based upon repeating the above process for five rows. In this example the root vehicle is $N_1$. Since vehicle 1 is represented as the first row in the mesh matrix 1900A, the process starts from the first row. First LNL includes vehicles 1, 2 and 3. Vehicle 1 connects both vehicle 2 and 3 through $L_{12}$ and $L_{13}$ respectively: $OLL(N_1)$ includes $L_{12}$ and $L_{13}$. This is depicted next to the first row in FIG. 23.

The process moves to the next row which pointer can be found in LNL, e.g., that is the entry next to the one just used for pointing to the previous row. In this case, the second row which is pointed by vehicle 2 ($N_2$) is the next row. At the second row, nothing needs to be done since all the vehicles to which vehicle 2 connects have been already included in LNL through the previous iteration, i.e., same vehicles. The next row is $N_3$. This time vehicle 4 and 5 ($N_4$ and $N_5$) are included in LNL, and $L_{34}$ and $L_{35}$ are included in OLL(N1). Accordingly at the forth row, $N_7$ and $L_{47}$ is included in LNL and OLL(N1) respectively. At the next row which is pointed by $N_5$, the vehicle 6 and 8 ($N_6$ and $N_8$) and the links $L_{56}$ and $L_{58}$ are included in LNL and OLL(N1) respectively. At this point, all the vehicles in the network are included in LNL and they can be connected through the links only listed in OLL(N1). The iteration for vehicle 1 stops. Those links listed in OLL (N1) form a spanning tree which root is vehicle 1.

The process is repeated for each vehicle in the mesh matrix 1900A, i.e., eight times in the illustrated example. The switching table 1500 is updated based upon the spanning tree 2000, e.g., link information. From $OLL(N_i)$ which is a spanning tree for $N_i$ as the root, entries for Source, Incoming, and Outgoing are obtained. The switching table 1500 can also include a column for the source.

Figure 21:
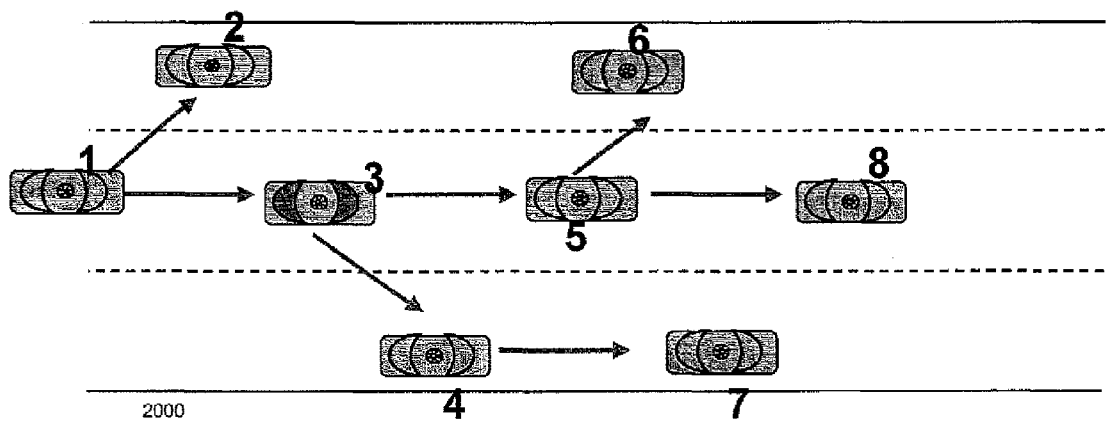
FIG. 21 illustrates an exemplary network of vehicles on a roadway having vehicles in the mesh matrix of FIG. 20.

FIG. 21 illustrates an exemplary network of vehicles on a roadway having the same vehicles as in the mesh matrix 1900A, e.g., 1-8. Also depicted in FIG. 21 is the exemplary spanning tree 2000 as derived in FIG. 20 for the mesh matrix 1900A. Its $OLL(N_1)$ contains $\{L_{12} L_{13} L_{34} L_{35} L_{47} L_{56} L_{58}\}$. First the root, $N_1$, becomes the entry for Source. If the updating was occurring at vehicle 3, all the links associated with vehicle 3 will be selected from the spanning tree 2000. In this example, those are $L_{13} L_{34} L_{35}$. If a link starts from vehicle 3, that link should be an entry for Outgoing link. Otherwise, the link becomes the entry for Incoming. $L_{34}$ and $L_{35}$ are the entries for Outgoing and $L_{13}$ is the entry for Incoming. $L_{34}$, $L_{35}$ and $L_{13}$ correspond to radios/antennas R1, F1, and B1

(interfaces) respectively for vehicle 3. FIG. 22 illustrates the resulting switched table 1500A for vehicle 3.

As described above, incoming and generated switched packets 1000 can be switched to all or a subset of the active links. The switched packets 1000 are replicated and relayed at the switching node without any modification to the packets. This is done in accordance with the switching table 1500.

Alternative, the switching node can modify the original switched packet 1000 to increase throughput for application such as, but not limited to, software downloads and updates, map updates, and vehicle collaboration including platooning and adaptive cruise control. For example, the switching node can encode the packet. On example of the encoding is group coding. In group coding, packets are coded resulting in modifications to the original packet. The incoming packets can come on all or a subset of the links. The outgoing coded packets are sent on all the active links. The information reaches the destinations faster resulting in higher overall throughput.

For example, two incoming switched packets 1000 (PacketIN A and Packet IN B) are received by the switching node (vehicle 1). The outgoing packets are m(A,B), where m is a mapping which operates on the incoming packets. Each outgoing coded packets could be the same or different on each of the outgoing links. For example, a XOR could be transmitted on each outgoing link, e.g. A⊕B. If the outgoing packets are different, the diversified packets can be generated by forming linear combinations with randomly chosen coefficients, e.g., $\alpha A + \beta B$ where coefficients $\alpha$ and $\beta$ are randomly chosen from a finite field.

The coding is done by the broadcast sub-layer 900. The broadcast sub-layer 900 includes an encoder, coding buffer and decoder. The encoding works in conjunction with the SPL 1100. After the SPL 1100 is updated with a switched packet 1000, the packet is copied to the coding buffer for encoding/decoding. When a new Coded/Uncoded Packet comes in SPL 1100 it is sent to the coding buffer. At a destination, coded packets are sent to decoder; and upon decoding are written back to coding buffer. At source and intermediary/forwarding vehicles, packets are sent to encoder which writes back to coding buffer. When the encoder writes to the coding buffer, packets are sent to links in the switching table 1500.

The operations such as addition, multiplications etc. are performed in the Galois field (GF). E.g., $1+1=0$ in GF(2).

Figure 23:
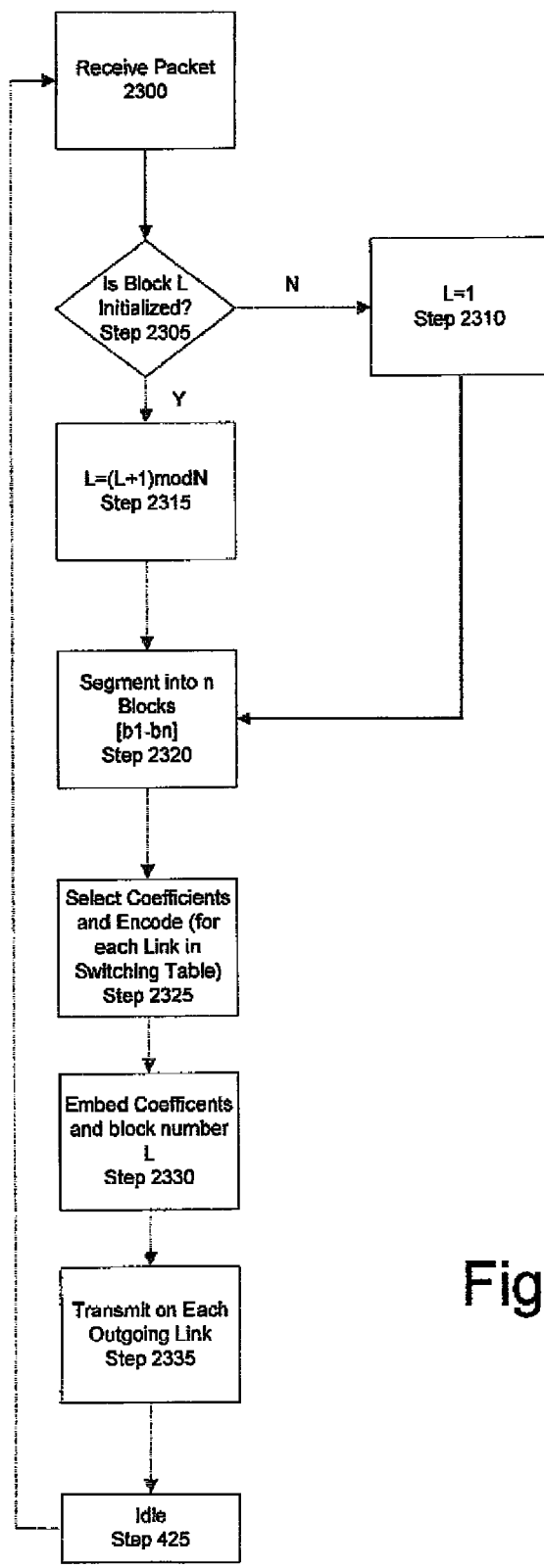
FIG. 23 illustrates an exemplary group coding at the source vehicle.

FIG. 23 illustrates an exemplary group coding at the source vehicle. The broadcast sub-layer 900 is triggered by receiving a packet for encoding (step 2300). Steps 2305-2315 are performed in the coding buffer and the encoder. At step 2305, a determination is made if the block number sequence had been initialized. If not ("N" at step 2305), then the block number is assigned to 1 in step 2310. If the block number L had been initialized ("Y" at step 2305), the received packet is assigned a block number that is 1 more than the previous block number at step 2315. The packet is segmented into n block at step 2320. N can be 8 bits for instance. The blocks are encoded using linear combinations with coefficients selected from a finite field at step 2325, e.g., if n=8, GF ($2^8$) can be used. The coefficients and block number L are embedded in each block at step 2330. Steps 2325 and 2330 are performed for each outgoing link in the switching table 1500 and the resulting packet is sent ton the outgoing links at step 2335. At the source vehicle, the original information in the packets is split into blocks, B1-Bn (step 2320). Each block or segment is of the same bit length, e.g., u. The value of n and u, depends on several system variables such as packet size, the network topology (broadcast capacity), number of edges etc. Depending on the roadway environment, the system can tune the parameters to provide an appropriate compromise between robustness, delay and throughput. The encoding and decoding can be done in a completely distributed fashion without the knowledge of the network topology. The process is independent of the presence of loops in the network and the direction of data transmission and the vehicle traffic.

For each active link in the switching table 1500, a linear combination is taken using coefficients chosen randomly (step 2325). The coefficients are selected and the information in encoded in blocks. The resultant size is the same as each of the original n blocks. The coefficients used to calculate the coded block are appended with the block for later decoding (step 2330). The encoded packets are transmitted on each outgoing link (step 2335). Steps 2325 and 2330 are repeated for each outgoing link. Afterwards, the broadcast sub-layer 900 returns to an idle state.

Figure 24:
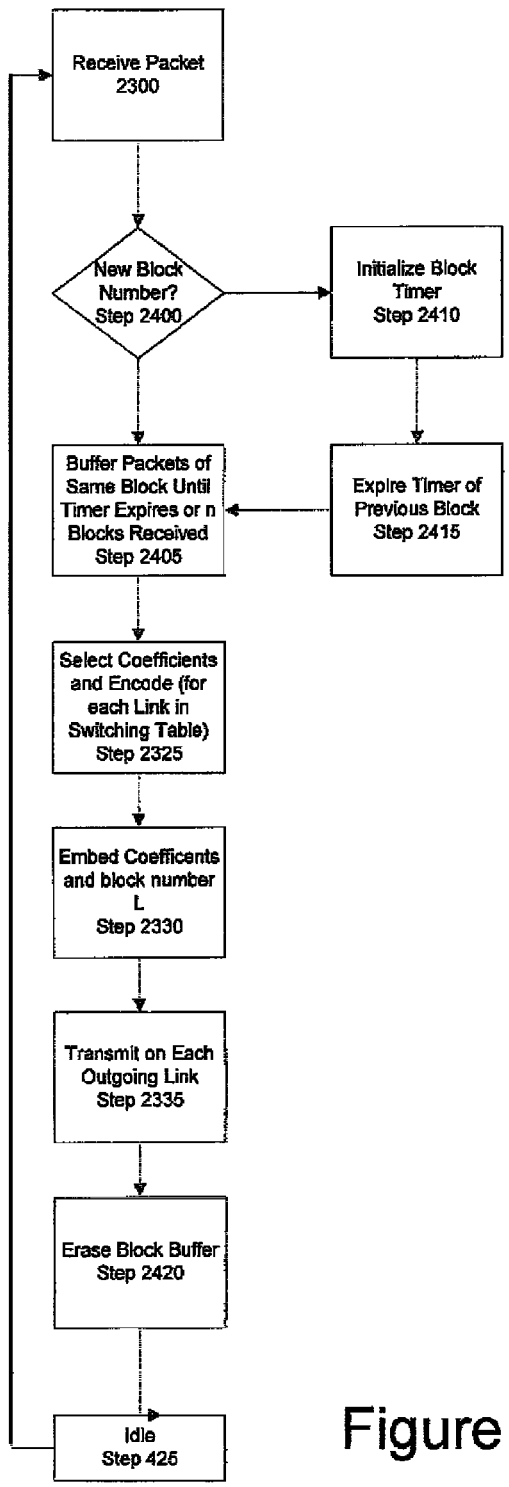
FIG. 24 illustrates an exemplary group coding at an intermediate vehicle.

FIG. 24 illustrates an exemplary group coding at an intermediate vehicle.

At intermediate vehicles, received blocks are coded in a similar fashion and sent therefore similar steps will not be described in detail again. For a stream of data at the source vehicle, encoding is done continuously. At step 2400, the broadcast sub-layer 900 determined if information having a new block number is received. The block numbers are determined based upon the embedded block numbers. The block numbers were embedded in the encoded packet by the source. If not ("N" at step 2400), packet(s) having the same block number are buffered in the coding buffer until a block timer expires T5, i.e., T5=0 (step 2405) or until n packets have been received, i.e., all packets from block. If the packet is a new block number ("Y" at step 2400), then T5 is initialized to a predetermined value at step 2410. Each block is associated with a timer and are removed when the timer expires to avoid unnecessary buildup in the buffer. The block is buffered for a time during which the vehicle waits for additional packets to arrive. The predetermined value can be customized and chosen based upon a plurality of criteria, e.g., maximum acceptable delay for packets for a given application. Depending on the network topology, intermediate vehicles may not be able to perform a full decoding. If the timer expires for a block, the block is removed from the buffer (step 2415). If a packet of a higher block number is received, the buffer for the previous block is flushed. If new blocks are received, it is unlikely that the previous block will be completed, i.e., N block will not be received.

If N blocks are received, the process goes to step 2325 for encoding and forwarding. Intermediate vehicles, code across different packets received in the same block number.

Figure 25:
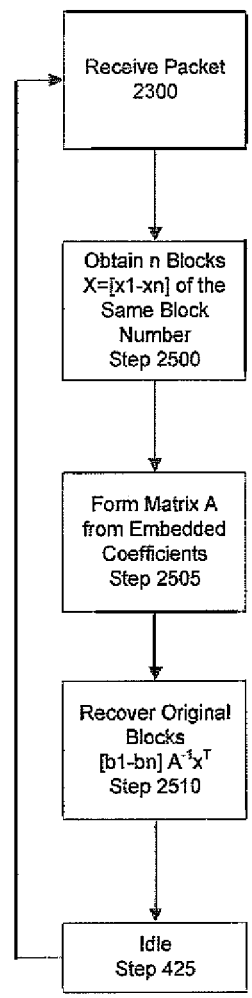
FIG. 25 illustrates an exemplary decoding at the destination or receiving vehicle.

FIG. 25 illustrates an exemplary decoding at the destination or receiving vehicle. When a packet is received (step 2300), the packet is buffered in the coding buffer. The packets are sorted in the coding buffer by block number (step 2500). The packets are buffered until N packets having the same block number arrive. Once N packets with the same block number arrive, decoding can proceed. At the receiver, all the packets of a particular block number are used for decoding. The coefficients are extracted from the packets. The coefficients for each particular block number are used to form a coefficient matrix (step 2505). As described above, the coefficients and block numbers are embedded in the packet. Each row of the matrix A corresponds to coefficients from the same block. At steps 2510, the original blocks are recovered. For example, the receiving vehicle (broadcast sub-layer 900) recovers the original blocks using a Gaussian elimination to decode the packets, i.e., inverse matrix operation. Once the information is decoded, the broadcast sub-layer 900 returns to an idle state.

The coding can operate using either the no-mesh or mesh routing protocol as described herein since the coefficients are selected for each link in the switching table 1500.

Figure 26:
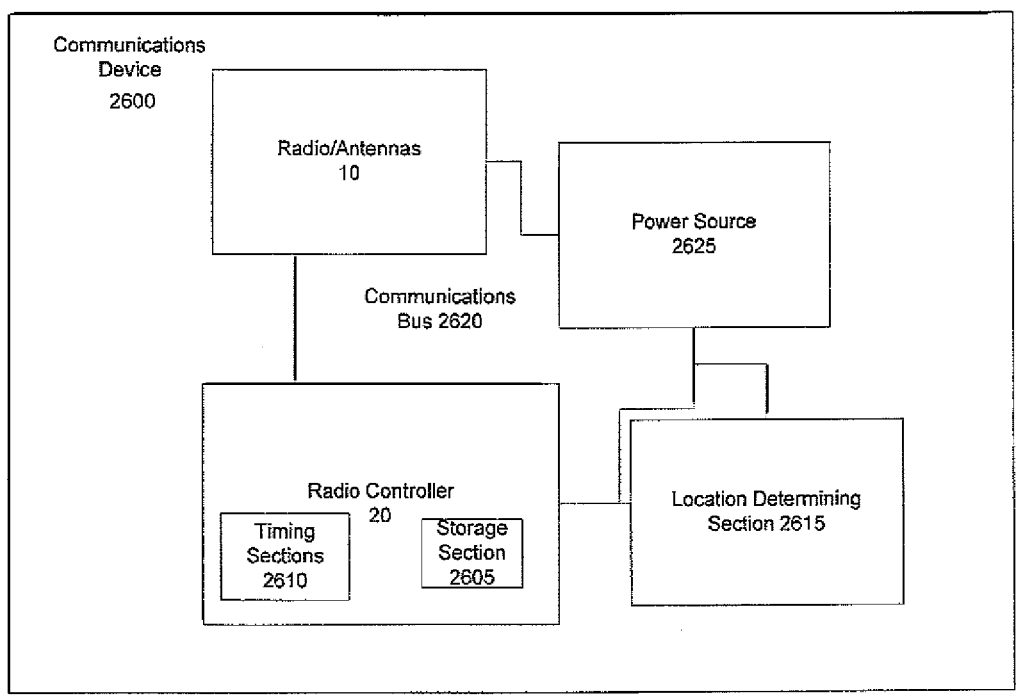
FIG. 26 illustrates a block diagram of the radio/antenna system or communications device in accordance with the invention.

FIG. 26 depicts a more detailed version of the radio/antenna system described in FIG. 1. The radio/antenna system, e.g., a communications device 2600 can implement the described method or protocol. A moving device or moving vehicle 1 will include the communications device 2600 which can be attached to, embedded in or used in combination with the moving vehicle.

The communications device 2600 includes a radio controller 20, a storage section 2605, a plurality of timing sections 2610, a location determining section 2615, a plurality of radio/antennas 10, communications bus 2620 and a power source 2625.

The radio controller 20 can be any type of controller such as, but not limited to, a microcontroller or a microprocessor. The radio controller 20 provides operational control by executing instructions, which have been programmed. A storage section 2605 is disposed within the radio controller 20 and in operational communication with the same. The storage section 2605 may be memory modules, removable media or a combination of multiple storage devices, etc., and is configured to store the processor-executable instructions necessary for the performance of the methods and protocols described herein.

Further, a plurality of timing sections 2610 are provided either as a separate component or in the radio controller 20 (shown as being in the radio controller 20). The timing sections 2610 provides the time interval tracking necessary for each of the timers referred to in the described herein, such as, but not limited to, the staleness time, Response timer, etc.

The communications bus 2620 is a data bus between each of the plurality of radios/antennas 10 and the radio controller 20. The switched packets 1000 are relayed to the radio controller 20 for examination and forwarding via the communications bus 2620. The radio controller 20 uses the communications bus to send the switched packets 1000 to the outgoing links (interfaces). The communication device 2600 can also include a location determining section 2615 such as a GPS device. Alternatively, the location determining section 2615 can be external such as one located in a moving vehicle 1 and the location information transmitted to the communication device 2600 through an I/O section (not shown). Additionally, other location information such as a compass direction and speed can also be transmitted to the communication device 2600 from the moving vehicle 1 via the I/O section.

A power source 2625 is electrically connected to all the components of the communications device 2600 for providing operational power to the components as necessary.

The communications device 2600 further includes an internal clock that maintains a clock for the device and is used as the timestamp for all messages.

The processor-executable instructions for performing the described embodiments may be embedded in the storage section 2605 in a form such as an EPROM, Flash memory or other such non-volatile storage. Additionally, the processor-executable instructions may be stored on a computer readable media such as an optical or magnetic medium, or may be downloadable over a network (e.g., Internet). Preferably, a user, as necessary, can periodically update the processor-executable instructions in order to provide additional enhancements to the system as they become available.

Each communications device 2600 is assigned a unique identifier to facilitate the transmission and reception of messages over the ad-hoc network. The unique identifier can be any number that is uniquely assigned to the communications device 2600 so that no device within a specific area has the same unique identifier. This identifier must be assigned quickly to support immediate communication, if necessary. The unique identifier can be any unique number or address that facilitates communication, such as a MAC address, VIN number or IP address, this identifier is used as the node's identifier. Any moving vehicle with the communications device 2600 can be a node of the ad-hoc network.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as "modules" or "system."

Various aspects of the present invention may be embodied as a program, software, or computer instructions embodied in a computer or machine usable or readable storage device, which causes the computer or machine to perform the functionality of the modules and disclosed herein when executed on the computer, processor, and/or machine. A program storage device readable by a machine, tangibly embodying a program of instructions executable by the machine to perform various functionalities and methods described in the present disclosure is also provided.

The system and functionality of the present invention may be implemented and run on a general-purpose computer or special-purpose computer system. The computer system may be any type of known or will be known systems.

The above description provides illustrative examples and it should not be construed that the present invention is limited to these particular example. Thus, various changes and modifications may be effected by one skilled in the art without departing from the spirit or scope of the invention as defined in the appended claims.

What is claimed is:

1. A multiple hop communications method among a plurality of moving vehicles, where each of the plurality of moving vehicles has a plurality of unidirectional radios comprising:
   receiving an incoming packet at one of the plurality of unidirectional radios of a moving vehicle;
   determining if there is an active link between each of the plurality of unidirectional radios of the moving vehicle and a unidirectional radio of a neighbor moving vehicle, the active link being formed based on a location of the plurality of unidirectional radios of the moving vehicle and covering two-hops with a smallest number of one-hop neighbor moving vehicles to the neighbor moving vehicle;
   relaying the incoming packet to the plurality of unidirectional radios of the moving vehicle having the active link; and
   transmitting the incoming packet as an outgoing packet from at least one of the plurality of unidirectional radios of the moving vehicle.

2. The multiple hop communications method according to claim 1, further comprising:
   detecting the unidirectional radio of the neighbor moving vehicle.

3. The multiple hop communications method according to claim 2, wherein the unidirectional radio of the neighbor moving vehicle is detected based upon receiving a periodic broadcast from the unidirectional radio of the neighbor moving vehicle, the periodic broadcast including a node identifier and radio identifier for the neighbor moving vehicle.

4. The multiple hop communications method according to claim 3, further comprising:
   storing in a detection table associated with the unidirectional radio, the node identifier and radio identifier for the neighbor moving vehicle;
   setting a staleness timer for the unidirectional radio of the neighbor moving vehicle to a variable staleness value; and
   associating the staleness timer with the neighbor moving vehicle in the detection table.

5. The multiple hop communications method according to claim 4, further comprising:
   removing the node identifier and radio identifier from the detection table when the staleness timer expires.

6. The multiple hop communications method according to claim 4, wherein the variable staleness value is based upon a speed of the neighbor moving vehicle and a speed of the moving vehicle.

7. The multiple hop communications method according to claim 4, further comprising:
   forming the active link.

8. The multiple hop communications method according to claim 7, wherein the active link is formed by a two-way handshake, the two-way handshake comprising:
   sending a request to the neighbor moving vehicle having the node identifier and radio identifier in the detection table, the request including a requesting node identifier, requesting node radio identifier, and the node identifier and radio identifier of the neighbor moving vehicle;
   starting a request timer; and
   adding a radio link to an active link table as an active link if a positive response is received from the neighbor moving vehicle prior to an expiration of the request timer, the active link table including the node identifier, radio identifier and a location of the neighbor moving vehicle.

9. The multiple hop communications method according to claim 7, further comprising:
   determining whether to form the active link between the moving vehicle and the neighbor moving vehicle having the node identifier and radio identifier in the detection table based upon at least one selection criterion.

10. The multiple hop communications method according to claim 9, wherein the at least one selection criterion is a location of the unidirectional radio corresponding to the radio identifier of the neighbor moving vehicle.

11. The multiple hop communications method according to claim 8, further comprising:
   removing the node identifier and radio identifier from the active link table when a second staleness timer expires.

12. The multiple hop communications method according to claim 1, further comprising:
   adding the incoming packet into a switched packet list table.

13. The multiple hop communications method according to claim 12, further comprising:
   determining if the incoming packet had been previously received based upon the switched packet list table; and
   discarding the incoming packet without relaying if the incoming packet had been previously received.

14. The multiple hop communications method according to claim 12, wherein if the incoming packet had not been previously received, the method further comprises transmitting the incoming packet from all of the plurality of unidirectional radios with an active link as an outgoing packet.

15. The multiple hop communications method according to claim 8, wherein a sub-set of the plurality of unidirectional radios with the active link transmit the outgoing packet.

16. The multiple hop communications method according to claim 15, further comprising:
   determining the sub-set of the plurality of unidirectional radios.

17. The multiple hop communications method according to claim 16, wherein the determining the sub-set of the plurality of unidirectional radios comprises:
   initializing a switching table to be empty;
   receiving, periodically a packet from the neighbor moving vehicle containing one-hop neighbor vehicle information for the neighbor moving vehicle;
   updating a two-hop table using the one-hop neighbor vehicle information, said updating including adding or changing a neighbor vehicle identifier, neighbor vehicle radio identifier and location;
   setting a timer for the updated two-hop table and the neighbor moving vehicle;
   determining if the neighbor moving vehicle is listed in a one-hop table is only neighbor of some moving vehicle in the two-hop table;
   adding a unidirectional radio corresponding to the neighbor moving vehicle to the switching table;
   removing the neighbor moving vehicle from the one-hop table and the two-hop table; and
   adding, iteratively, a unidirectional link corresponding to the neighbor moving vehicle from the one-hop table that is linked to a maximum number of moving vehicles in the two-hop table, removing the neighbor moving vehicle from the one-hop table and the two-hop table.

18. The multiple hop communications method according to claim 17, wherein a unidirectional radio is determined as the sub-set if the unidirectional radio is in the switching table.

19. The multiple hop communications method according to claim 1, further comprising:
   generating the incoming packet at a source moving vehicle.

20. The multiple hop communications method according to claim 19, wherein the generating comprises:
   defining a session for the incoming packet, the session including a session identifier and at least one destination moving vehicle identifier;
   determining a network session scope for the incoming packet, the network session scope including at least a maximum hop count;
   generating a payload for the incoming packet; and
   generating a header for the incoming packet including at least the session identifier and the network session scope.

21. The multiple hop communications method according to claim 20, further comprising:
   determining if the moving vehicle is a destination;
   determining if the network session scope has been reached; and
   discarding the incoming packet without relaying if the network session scope has been reached.

22. A multiple hop communications method among a plurality of moving vehicles, where each of the plurality of moving vehicles has a plurality of unidirectional radios comprising:
   receiving at least two incoming packets by at least one of the plurality of unidirectional radios of a moving vehicle;
   determining if there is an active link between each of the plurality of unidirectional radios of the moving vehicle and a unidirectional radio of a neighbor moving vehicle and covering two-hops with a smallest number of one-hop neighbor moving vehicles to the neighbor moving vehicle;
encoding the at least two incoming packets using group coding;
performing an XOR operation on the at least two incoming packets to produce a different encoded packet;
relaying the different encoded packet to each of the plurality of unidirectional radios of the moving vehicle having the active link; and
transmitting the different encoded packet as outgoing packets from each of the plurality of unidirectional radios of the moving vehicle having the active link, respectively.

23. The multiple hop communications method according of claim 22, wherein the encoding comprises:
mapping the at least two incoming packets using a plurality of mapping coefficients.

24. The multiple hop communications method according of claim 23, wherein the mapping is a linear combination of the at least two incoming packets and the mapping coefficients are randomly determined.

25. A mobile wireless communications device comprising:
a plurality of unidirectional radios, at least one of the plurality of unidirectional radios being located on each side of the mobile wireless communications device; and
a processor for determining if there is an active link between each of the plurality of unidirectional radios and a unidirectional radio of a neighbor vehicle, the active link being formed based on a location of the plurality of unidirectional radios and covering two-hops with a smallest number of one-hop neighbor vehicles to the neighbor vehicle, and relaying an incoming packet to the plurality of unidirectional radios having the active link, the incoming packet being transmitted as an outgoing packet from at least one of the plurality of unidirectional radios.

26. The mobile wireless communications device of claim 25, wherein the unidirectional radio of the neighbor vehicle is detected based upon receiving a periodic broadcast from the unidirectional radio of the neighbor vehicle, the periodic broadcast including a node identifier and radio identifier for the neighbor vehicle.

27. The mobile wireless communications device of claim 26, further comprising:
a storage device for storing a detection table having detection information for each of the plurality of unidirectional radios; and
a staleness timer set to a variable staleness value for the unidirectional radio of the neighbor vehicle.

28. The mobile wireless communications device of claim 27, wherein the processor removes the node identifier and radio identifier from the detection table when the staleness timer expires.

29. The mobile wireless communications device of claim 27, further comprising:
a request timer;
wherein the storage device stores an active link table having link information for each of the plurality of unidirectional radios, wherein the processor forms the active link by sending a request to the neighbor vehicle having the node identifier and radio identifier in the detection table associated with one of the plurality of unidirectional radios, the request including a requesting node identifier, requesting node radio identifier, the node identifier and radio identifier of the neighbor vehicle, starts the request timer; and adds a radio link to the active link table as an active link if a positive response is received from the neighbor vehicle prior to an expiration of the request timer, the active link table including the node identifier, the radio identifier and a location of the neighbor vehicle.

30. The mobile wireless communications device of claim 29, wherein the storage device stores a switched packet list table for the incoming packet, wherein the processor adds the incoming packet into the switched packet list table that corresponds to the unidirectional radio that received the incoming packet.

31. The mobile wireless communications device of claim 30, wherein the processor determines if the incoming packet had been previously received based upon the switched packet list table and discards the incoming packet without relaying if the incoming packet had been previously received.

32. The mobile wireless communications device of claim 31, wherein if the incoming packet had not been previously received, the incoming packet is transmitted from all of the plurality of unidirectional radios having an active link as an outgoing packet.

33. The mobile wireless communications device of claim 32 wherein a sub-set of the plurality of unidirectional radios with the active link transmit the outgoing packet.

34. The mobile wireless communications device of claim 33, further comprising:
an update timer,
wherein the storage device stores a one-hop table and a two-hop table, and wherein the processor determines the sub-set of the plurality of unidirectional radios with the active link for transmitting the outgoing packet by initializing a switching table to be empty;
periodically receiving a packet from the neighbor vehicle containing one-hop neighbor vehicle information for the neighbor vehicle;
updating the two-hop table using the one-hop neighbor vehicle information, the updating including adding or changing a neighbor vehicle identifier, neighbor vehicle radio identifier and location;
setting the update timer for the updated two-hop table and the neighbor vehicle;
determining if the neighbor vehicle is listed in the one-hop table is only neighbor of some vehicle in the two-hop table;
adding a unidirectional radio corresponding to the neighbor vehicle to the switching table;
removing the neighbor vehicle from the one-hop table and the two-hop table; and
adding, iteratively, a unidirectional link corresponding to the neighbor vehicle from the one-hop table that is linked to a maximum number of vehicles in the two-hop table, removing the neighbor vehicle from the one-hop table and the two-hop table, all active links in the switching table transmit the outgoing packet.

35. A non-transitory computer readable storage device having a program of instructions for causing a computer to execute the method of:
receiving an incoming packet at one of a plurality of unidirectional radios in a mobile device;
determining if there is an active link between each of the plurality of unidirectional radios of the mobile device and a unidirectional radio of another mobile device, the active link being formed based on a location of the plurality of unidirectional radios of the mobile device and covering two-hops with a smallest number of one-hop mobile devices to the another mobile device;

relaying the incoming packet to the plurality of unidirectional radios of the mobile device having the active link; and transmitting the incoming packet as an outgoing packet from at least one of the plurality of unidirectional radios of the mobile device.

36. A non-transitory computer readable storage device having a program of instructions for causing a computer to execute the method of:

receiving at least two incoming packets from at least one of a plurality of unidirectional radios of a mobile device;

determining if there is an active link between each of the plurality of unidirectional radios of the mobile device and a unidirectional radio of another mobile device and covering two-hops with a smallest number of one-hop mobile devices to the another mobile device;

encoding the at least two incoming packets using group coding;

performing an XOR operation on the at least two incoming packets to produce a different encoded packet;

relaying the different encoded packet to each of the plurality of unidirectional radios of the mobile device having the active link; and transmitting the different encoded packet as outgoing packets from each of the plurality of unidirectional radios of the mobile device having the active link, respectively.

37. The non-transitory computer readable storage device of claim 36, wherein encoding comprises: mapping the at least two incoming packets using a plurality of mapping coefficients.

38. The non-transitory computer readable storage device of claim 37, wherein the mapping is a linear combination of the at least two incoming packets and the mapping coefficients are randomly determined.

* * * * *